(12) United States Patent
Harel

(10) Patent No.: US 10,292,114 B2
(45) Date of Patent: *May 14, 2019

(54) OFFSETTING UNWANTED DOWNLINK INTERFERENCE SIGNALS IN AN UPLINK PATH IN A DISTRIBUTED ANTENNA SYSTEM (DAS)

(71) Applicant: Corning Optical Communications Wireless Ltd, Airport City (IL)

(72) Inventor: Dror Harel, Hod Hasharon (IL)

(73) Assignee: Corning Optical Communications LLC, Hickory, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/794,605

(22) Filed: Oct. 26, 2017

(65) Prior Publication Data

US 2018/0063795 A1 Mar. 1, 2018

Related U.S. Application Data

(63) Continuation of application No. 15/042,532, filed on Feb. 12, 2016, now Pat. No. 9,807,700.

(Continued)

(51) Int. Cl.
*H04B 1/00* (2006.01)
*H04B 17/00* (2015.01)
(Continued)

(52) U.S. Cl.
CPC .......... *H04W 52/243* (2013.01); *H04B 17/11* (2015.01); *H04B 17/345* (2015.01);
(Continued)

(58) Field of Classification Search
CPC ... H04B 1/04; H04B 1/10; H04B 1/38; H04B 1/40; H04B 1/56; H04B 1/109;
(Continued)

(56) References Cited

U.S. PATENT DOCUMENTS 3,529,715 A 9/1970 Kitko et al.
3,663,762 A 5/1972 Joel, Jr.
(Continued)

FOREIGN PATENT DOCUMENTS

AU 645192 B 10/1992
AU 731180 B2 3/1998
(Continued)

OTHER PUBLICATIONS

Seto et al., "Optical Subcarrier Multiplexing Transmission for Base Station With Adaptive Array Antenna," IEEE Transactions on Microwave Theory and Techniques, vol. 49, No. 10, Oct. 2001, pp. 2036-2041.

(Continued)

*Primary Examiner* — Quochien B Vuong
(74) *Attorney, Agent, or Firm* — C. Keith Montgomery

(57) ABSTRACT

Offsetting unwanted downlink interference signals in an uplink path in a distributed antenna system (DAS) is disclosed. In this regard, in one example, an interference signal offset circuit is provided in an RAU to offset interference products leaked from a downlink path to an uplink path. An offset signal generation circuit is configured to generate at least one uplink interference offset signal based on the interference products leaked from the downlink path. A signal summing circuit is configured to combine the at least one uplink interference offset signal with an uplink signal received on the uplink path, thus offsetting the interference products in the uplink signal. By providing the interference signal offset circuit in the RAU to offset the interference products on the uplink path, it is possible to provide more implementation flexibility for the RAU without degrading the uplink signal.

21 Claims, 7 Drawing Sheets

Related U.S. Application Data

(60) Provisional application No. 62/118,186, filed on Feb. 19, 2015.

(51) Int. Cl.
| | |
|---|---|
| *H04W 52/24* | (2009.01) |
| *H04W 72/04* | (2009.01) |
| *H04W 72/08* | (2009.01) |
| *H04B 17/11* | (2015.01) |
| *H04B 17/345* | (2015.01) |
| *H04B 7/022* | (2017.01) |
| *H04B 17/14* | (2015.01) |
| *H04B 17/13* | (2015.01) |

(52) U.S. Cl.
CPC ..... *H04W 72/0406* (2013.01); *H04W 72/082* (2013.01); *H04W 72/085* (2013.01); *H04B 7/022* (2013.01); *H04B 17/0085* (2013.01); *H04B 17/13* (2015.01); *H04B 17/14* (2015.01)

(58) Field of Classification Search
CPC ........ H04B 1/525; H04B 1/3833; H04B 3/46; H04B 15/00; H04B 17/00; H04B 17/309; H04B 17/318; H04B 17/345; H04W 28/048; H04W 28/0236; H04W 52/24; H04W 72/085
USPC .... 455/63.1, 67.11, 67.13, 78, 83, 283, 296, 455/552.1, 553.1
See application file for complete search history.

(56) References Cited

U.S. PATENT DOCUMENTS

| | | |
|---|---|---|
| 4,365,865 A | 12/1982 | Stiles |
| 4,449,246 A | 5/1984 | Seiler et al. |
| 4,573,212 A | 2/1986 | Lipsky |
| 4,665,560 A | 5/1987 | Lange |
| 4,812,851 A | 3/1989 | Guibardo |
| 4,867,527 A | 9/1989 | Dotti et al. |
| 4,889,977 A | 12/1989 | Haydon |
| 4,896,939 A | 1/1990 | O'Brien |
| 4,916,460 A | 4/1990 | Powell |
| 4,939,852 A | 7/1990 | Brenner |
| 4,972,346 A | 11/1990 | Kawano et al. |
| 5,039,195 A | 8/1991 | Jenkins et al. |
| 5,042,086 A | 8/1991 | Cole et al. |
| 5,056,109 A | 10/1991 | Gilhousen et al. |
| 5,059,927 A | 10/1991 | Cohen |
| 5,125,060 A | 6/1992 | Edmundson |
| 5,187,803 A | 2/1993 | Sohner et al. |
| 5,189,718 A | 2/1993 | Barrett et al. |
| 5,189,719 A | 2/1993 | Coleman et al. |
| 5,206,655 A | 4/1993 | Caille et al. |
| 5,208,812 A | 5/1993 | Dudek et al. |
| 5,210,812 A | 5/1993 | Nilsson et al. |
| 5,260,957 A | 11/1993 | Hakimi |
| 5,263,108 A | 11/1993 | Kurokawa et al. |
| 5,267,122 A | 11/1993 | Glover et al. |
| 5,268,971 A | 12/1993 | Nilsson et al. |
| 5,278,690 A | 1/1994 | Vella-Coleiro |
| 5,278,989 A | 1/1994 | Burke et al. |
| 5,280,472 A | 1/1994 | Gilhousen et al. |
| 5,299,947 A | 4/1994 | Barnard |
| 5,301,056 A | 4/1994 | O'Neill |
| 5,325,223 A | 6/1994 | Bears |
| 5,339,058 A | 8/1994 | Lique |
| 5,339,184 A | 8/1994 | Tang |
| 5,343,320 A | 8/1994 | Anderson |
| 5,377,035 A | 12/1994 | Wang et al. |
| 5,379,455 A | 1/1995 | Koschek |
| 5,381,459 A | 1/1995 | Lappington |
| 5,396,224 A | 3/1995 | Dukes et al. |
| 5,400,391 A | 3/1995 | Emura et al. |
| 5,420,863 A | 5/1995 | Taketsugu et al. |
| 5,424,864 A | 6/1995 | Emura |
| 5,444,564 A | 8/1995 | Newberg |
| 5,457,557 A | 10/1995 | Zarem et al. |
| 5,459,727 A | 10/1995 | Vannucci |
| 5,469,523 A | 11/1995 | Blew et al. |
| 5,519,830 A | 5/1996 | Opoczynski |
| 5,543,000 A | 8/1996 | Lique |
| 5,546,443 A | 8/1996 | Raith |
| 5,557,698 A | 9/1996 | Gareis et al. |
| 5,574,815 A | 11/1996 | Kneeland |
| 5,598,288 A | 1/1997 | Collar |
| 5,606,725 A | 2/1997 | Hart |
| 5,615,034 A | 3/1997 | Hori |
| 5,627,879 A | 5/1997 | Russell et al. |
| 5,640,678 A | 6/1997 | Ishikawa et al. |
| 5,642,405 A | 6/1997 | Fischer et al. |
| 5,644,622 A | 7/1997 | Russell et al. |
| 5,648,961 A | 7/1997 | Ebihara |
| 5,651,081 A | 7/1997 | Blew et al. |
| 5,657,374 A | 8/1997 | Russell et al. |
| 5,668,562 A | 9/1997 | Cutrer et al. |
| 5,677,974 A | 10/1997 | Elms et al. |
| 5,682,256 A | 10/1997 | Motley et al. |
| 5,694,232 A | 12/1997 | Parsay et al. |
| 5,703,602 A | 12/1997 | Casebolt |
| 5,708,681 A | 1/1998 | Malkemes et al. |
| 5,726,984 A | 3/1998 | Kubler et al. |
| 5,765,099 A | 6/1998 | Georges et al. |
| 5,790,536 A | 8/1998 | Mahany et al. |
| 5,790,606 A | 8/1998 | Dent |
| 5,793,772 A | 8/1998 | Burke et al. |
| 5,802,173 A | 9/1998 | Hamilton-Piercy et al. |
| 5,802,473 A | 9/1998 | Rutledge et al. |
| 5,805,975 A | 9/1998 | Green, Sr. et al. |
| 5,805,983 A | 9/1998 | Naidu et al. |
| 5,809,395 A | 9/1998 | Hamilton-Piercy et al. |
| 5,809,431 A | 9/1998 | Bustamante et al. |
| 5,812,296 A | 9/1998 | Tarusawa et al. |
| 5,818,619 A | 10/1998 | Medved et al. |
| 5,818,883 A | 10/1998 | Smith et al. |
| 5,821,510 A | 10/1998 | Cohen et al. |
| 5,825,651 A | 10/1998 | Gupta et al. |
| 5,838,474 A | 11/1998 | Stilling |
| 5,839,052 A | 11/1998 | Dean et al. |
| 5,852,651 A | 12/1998 | Fischer et al. |
| 5,854,986 A | 12/1998 | Dorren et al. |
| 5,859,719 A | 1/1999 | Dentai et al. |
| 5,862,460 A | 1/1999 | Rich |
| 5,867,485 A | 2/1999 | Chambers et al. |
| 5,867,763 A | 2/1999 | Dean et al. |
| 5,881,200 A | 3/1999 | Burt |
| 5,883,882 A | 3/1999 | Schwartz |
| 5,896,568 A | 4/1999 | Tseng et al. |
| 5,903,834 A | 5/1999 | Wallstedt et al. |
| 5,910,776 A | 6/1999 | Black |
| 5,913,003 A | 6/1999 | Arroyo et al. |
| 5,917,636 A | 6/1999 | Wake et al. |
| 5,930,682 A | 7/1999 | Schwartz et al. |
| 5,936,754 A | 8/1999 | Ariyavisitakul et al. |
| 5,943,372 A | 8/1999 | Gans et al. |
| 5,946,622 A | 8/1999 | Bojeryd |
| 5,949,564 A | 9/1999 | Wake |
| 5,953,670 A | 9/1999 | Newson |
| 5,959,531 A | 9/1999 | Gallagher, III et al. |
| 5,960,344 A | 9/1999 | Mahany |
| 5,969,837 A | 10/1999 | Farber et al. |
| 5,983,070 A | 11/1999 | Georges et al. |
| 5,987,303 A | 11/1999 | Dutta et al. |
| 6,005,884 A | 12/1999 | Cook et al. |
| 6,006,069 A | 12/1999 | Langston et al. |
| 6,006,105 A | 12/1999 | Rostoker et al. |
| 6,011,980 A | 1/2000 | Nagano et al. |
| 6,014,546 A | 1/2000 | Georges et al. |
| 6,016,426 A | 1/2000 | Bodell |
| 6,023,625 A | 2/2000 | Myers, Jr. |
| 6,037,898 A | 3/2000 | Parish et al. |
| 6,061,161 A | 5/2000 | Yang et al. |
| 6,069,721 A | 5/2000 | Oh et al. |

(56) References Cited

U.S. PATENT DOCUMENTS

| | | |
|---|---|---|
| 6,088,381 A | 7/2000 | Myers, Jr. |
| 6,118,767 A | 9/2000 | Shen et al. |
| 6,122,529 A | 9/2000 | Sabat, Jr. et al. |
| 6,127,917 A | 10/2000 | Tuttle |
| 6,128,470 A | 10/2000 | Naidu et al. |
| 6,128,477 A | 10/2000 | Freed |
| 6,148,041 A | 11/2000 | Dent |
| 6,150,921 A | 11/2000 | Werb et al. |
| 6,157,810 A | 12/2000 | Georges et al. |
| 6,192,216 B1 | 2/2001 | Sabat, Jr. et al. |
| 6,194,968 B1 | 2/2001 | Winslow |
| 6,212,397 B1 | 4/2001 | Langston et al. |
| 6,222,503 B1 | 4/2001 | Gietema |
| 6,223,201 B1 | 4/2001 | Reznak |
| 6,232,870 B1 | 5/2001 | Garber et al. |
| 6,236,789 B1 | 5/2001 | Fitz |
| 6,236,863 B1 | 5/2001 | Waldroup et al. |
| 6,240,274 B1 | 5/2001 | Izadpanah |
| 6,246,500 B1 | 6/2001 | Ackerman |
| 6,268,946 B1 | 7/2001 | Larkin et al. |
| 6,275,990 B1 | 8/2001 | Dapper et al. |
| 6,279,158 B1 | 8/2001 | Geile et al. |
| 6,286,163 B1 | 9/2001 | Trimble |
| 6,292,673 B1 | 9/2001 | Maeda et al. |
| 6,295,451 B1 | 9/2001 | Mimura |
| 6,301,240 B1 | 10/2001 | Slabinski et al. |
| 6,307,869 B1 | 10/2001 | Pawelski |
| 6,314,163 B1 | 11/2001 | Acampora |
| 6,317,599 B1 | 11/2001 | Rappaport et al. |
| 6,323,980 B1 | 11/2001 | Bloom |
| 6,324,391 B1 | 11/2001 | Bodell |
| 6,330,241 B1 | 12/2001 | Fort |
| 6,330,244 B1 | 12/2001 | Swartz et al. |
| 6,334,219 B1 | 12/2001 | Hill et al. |
| 6,336,021 B1 | 1/2002 | Nukada |
| 6,336,042 B1 | 1/2002 | Dawson et al. |
| 6,337,754 B1 | 1/2002 | Imajo |
| 6,340,932 B1 | 1/2002 | Rodgers et al. |
| 6,353,406 B1 | 3/2002 | Lanzl et al. |
| 6,353,600 B1 | 3/2002 | Schwartz et al. |
| 6,359,714 B1 | 3/2002 | Imajo |
| 6,370,203 B1 | 4/2002 | Boesch et al. |
| 6,374,078 B1 | 4/2002 | Williams et al. |
| 6,374,124 B1 | 4/2002 | Slabinski |
| 6,389,010 B1 | 5/2002 | Kubler et al. |
| 6,400,318 B1 | 6/2002 | Kasami et al. |
| 6,400,418 B1 | 6/2002 | Wakabayashi |
| 6,404,775 B1 | 6/2002 | Leslie et al. |
| 6,405,018 B1 | 6/2002 | Reudink et al. |
| 6,405,058 B2 | 6/2002 | Bobier |
| 6,405,308 B1 | 6/2002 | Gupta et al. |
| 6,414,624 B2 | 7/2002 | Endo et al. |
| 6,415,132 B1 | 7/2002 | Sabat, Jr. |
| 6,421,327 B1 | 7/2002 | Lundby et al. |
| 6,438,301 B1 | 8/2002 | Johnson et al. |
| 6,438,371 B1 | 8/2002 | Fujise et al. |
| 6,448,558 B1 | 9/2002 | Greene |
| 6,452,915 B1 | 9/2002 | Jorgensen |
| 6,459,519 B1 | 10/2002 | Sasai et al. |
| 6,459,989 B1 | 10/2002 | Kirkpatrick et al. |
| 6,472,952 B1 | 10/2002 | Sakai et al. |
| 6,477,154 B1 | 11/2002 | Cheong et al. |
| 6,480,702 B1 | 11/2002 | Sabat, Jr. |
| 6,486,907 B1 | 11/2002 | Farber et al. |
| 6,496,290 B1 | 12/2002 | Lee |
| 6,501,965 B1 | 12/2002 | Lucidarme |
| 6,504,636 B1 | 1/2003 | Seto et al. |
| 6,504,831 B1 | 1/2003 | Greenwood et al. |
| 6,512,478 B1 | 1/2003 | Chien |
| 6,519,395 B1 | 2/2003 | Bevan et al. |
| 6,519,449 B1 | 2/2003 | Zhang et al. |
| 6,525,855 B1 | 2/2003 | Westbrook et al. |
| 6,535,330 B1 | 3/2003 | Lelic et al. |
| 6,535,720 B1 | 3/2003 | Kintis et al. |
| 6,556,551 B1 | 4/2003 | Schwartz |
| 6,570,913 B1 | 5/2003 | Chen |
| 6,577,794 B1 | 6/2003 | Currie et al. |
| 6,577,801 B2 | 6/2003 | Broderick et al. |
| 6,580,402 B2 | 6/2003 | Navarro et al. |
| 6,580,905 B1 | 6/2003 | Naidu et al. |
| 6,580,918 B1 | 6/2003 | Leickel et al. |
| 6,583,763 B2 | 6/2003 | Judd |
| 6,587,514 B1 | 7/2003 | Wright et al. |
| 6,594,496 B2 | 7/2003 | Schwartz |
| 6,597,325 B2 | 7/2003 | Judd et al. |
| 6,598,009 B2 | 7/2003 | Yang |
| 6,606,430 B2 | 8/2003 | Bartur et al. |
| 6,615,074 B2 | 9/2003 | Mickle et al. |
| 6,628,732 B1 | 9/2003 | Takaki |
| 6,634,811 B1 | 10/2003 | Gertel et al. |
| 6,636,747 B2 | 10/2003 | Harada et al. |
| 6,640,103 B1 | 10/2003 | Inman et al. |
| 6,643,437 B1 | 11/2003 | Park |
| 6,652,158 B2 | 11/2003 | Bartur et al. |
| 6,654,590 B2 | 11/2003 | Boros et al. |
| 6,654,616 B1 | 11/2003 | Pope, Jr. et al. |
| 6,657,535 B1 | 12/2003 | Magbie et al. |
| 6,658,269 B1 | 12/2003 | Golemon et al. |
| 6,665,308 B1 | 12/2003 | Rakib et al. |
| 6,670,930 B2 | 12/2003 | Navarro |
| 6,674,966 B1 | 1/2004 | Koonen |
| 6,675,294 B1 | 1/2004 | Gupta et al. |
| 6,678,509 B2 | 1/2004 | Skarman et al. |
| 6,687,437 B1 | 2/2004 | Starnes et al. |
| 6,690,328 B2 | 2/2004 | Judd |
| 6,701,137 B1 | 3/2004 | Judd et al. |
| 6,704,298 B1 | 3/2004 | Matsumiya et al. |
| 6,704,545 B1 | 3/2004 | Wala |
| 6,710,366 B1 | 3/2004 | Lee et al. |
| 6,714,800 B2 | 3/2004 | Johnson et al. |
| 6,731,880 B2 | 5/2004 | Westbrook et al. |
| 6,745,013 B1 | 6/2004 | Porter et al. |
| 6,758,913 B1 | 7/2004 | Tunney et al. |
| 6,763,226 B1 | 7/2004 | McZeal, Jr. |
| 6,771,862 B2 | 8/2004 | Karnik et al. |
| 6,771,933 B1 | 8/2004 | Eng et al. |
| 6,784,802 B1 | 8/2004 | Stanescu |
| 6,785,558 B1 | 8/2004 | Stratford et al. |
| 6,788,666 B1 | 9/2004 | Linebarger et al. |
| 6,801,767 B1 | 10/2004 | Schwartz et al. |
| 6,807,374 B1 | 10/2004 | Imajo et al. |
| 6,812,824 B1 | 11/2004 | Goldinger et al. |
| 6,812,905 B2 | 11/2004 | Thomas et al. |
| 6,823,174 B1 | 11/2004 | Masenten et al. |
| 6,826,163 B2 | 11/2004 | Mani et al. |
| 6,826,164 B2 | 11/2004 | Mani et al. |
| 6,826,337 B2 | 11/2004 | Linnell |
| 6,836,660 B1 | 12/2004 | Wala |
| 6,836,673 B1 | 12/2004 | Trott |
| 6,842,433 B2 | 1/2005 | West et al. |
| 6,847,856 B1 | 1/2005 | Bohannon |
| 6,850,510 B2 | 2/2005 | Kubler |
| 6,865,390 B2 | 3/2005 | Goss et al. |
| 6,873,823 B2 | 3/2005 | Hasarchi |
| 6,876,056 B2 | 4/2005 | Tilmans et al. |
| 6,879,290 B1 | 4/2005 | Toutain et al. |
| 6,882,311 B2 | 4/2005 | Walker et al. |
| 6,883,710 B2 | 4/2005 | Chung |
| 6,885,344 B2 | 4/2005 | Mohamadi |
| 6,885,846 B1 | 4/2005 | Panasik et al. |
| 6,889,060 B2 | 5/2005 | Fernando et al. |
| 6,909,399 B1 | 6/2005 | Zegelin et al. |
| 6,915,058 B2 | 7/2005 | Pons |
| 6,915,529 B1 | 7/2005 | Suematsu et al. |
| 6,919,858 B2 | 7/2005 | Rofougaran |
| 6,920,330 B2 | 7/2005 | Caronni et al. |
| 6,924,997 B2 | 8/2005 | Chen et al. |
| 6,930,987 B1 | 8/2005 | Fukuda et al. |
| 6,931,183 B2 | 8/2005 | Panak et al. |
| 6,931,659 B1 | 8/2005 | Kinemura |
| 6,933,849 B2 | 8/2005 | Sawyer |
| 6,934,511 B1 | 8/2005 | Lovinggood et al. |
| 6,934,541 B2 | 8/2005 | Miyatani |
| 6,941,112 B2 | 9/2005 | Hasegawa |

(56) References Cited

U.S. PATENT DOCUMENTS

| | | |
|---|---|---|
| 6,946,989 B2 | 9/2005 | Vavik |
| 6,961,312 B2 | 11/2005 | Kubler et al. |
| 6,963,289 B2 | 11/2005 | Aljadeff et al. |
| 6,963,552 B2 | 11/2005 | Sabat, Jr. et al. |
| 6,965,718 B2 | 11/2005 | Koertel |
| 6,967,347 B2 | 11/2005 | Estes et al. |
| 6,968,107 B2 | 11/2005 | Belardi et al. |
| 6,970,652 B2 | 11/2005 | Zhang et al. |
| 6,973,243 B2 | 12/2005 | Koyasu et al. |
| 6,974,262 B1 | 12/2005 | Rickenbach |
| 6,977,502 B1 | 12/2005 | Hertz |
| 7,002,511 B1 | 2/2006 | Ammar et al. |
| 7,006,465 B2 | 2/2006 | Toshimitsu et al. |
| 7,013,087 B2 | 3/2006 | Suzuki et al. |
| 7,015,826 B1 | 3/2006 | Chan et al. |
| 7,020,473 B2 | 3/2006 | Splett |
| 7,020,488 B1 | 3/2006 | Bleile et al. |
| 7,024,166 B2 | 4/2006 | Wallace |
| 7,035,512 B2 | 4/2006 | Van Bijsterveld |
| 7,035,671 B2 | 4/2006 | Solum |
| 7,039,399 B2 | 5/2006 | Fischer |
| 7,043,271 B1 | 5/2006 | Seto et al. |
| 7,047,028 B2 | 5/2006 | Cagenius et al. |
| 7,050,017 B2 | 5/2006 | King et al. |
| 7,053,838 B2 | 5/2006 | Judd |
| 7,054,513 B2 | 5/2006 | Herz et al. |
| 7,069,577 B2 | 6/2006 | Geile et al. |
| 7,072,586 B2 | 7/2006 | Aburakawa et al. |
| 7,082,320 B2 | 7/2006 | Kattukaran et al. |
| 7,084,769 B2 | 8/2006 | Bauer et al. |
| 7,093,985 B2 | 8/2006 | Lord et al. |
| 7,103,119 B2 | 9/2006 | Matsuoka et al. |
| 7,103,377 B2 | 9/2006 | Bauman et al. |
| 7,106,252 B2 | 9/2006 | Smith et al. |
| 7,106,931 B2 | 9/2006 | Sutehall et al. |
| 7,110,795 B2 | 9/2006 | Doi |
| 7,114,859 B1 | 10/2006 | Tuohimaa et al. |
| 7,127,175 B2 | 10/2006 | Mani et al. |
| 7,127,176 B2 | 10/2006 | Sasaki |
| 7,142,503 B1 | 11/2006 | Grant et al. |
| 7,142,535 B2 | 11/2006 | Kubler et al. |
| 7,142,619 B2 | 11/2006 | Sommer et al. |
| 7,146,506 B1 | 12/2006 | Hannah et al. |
| 7,160,032 B2 | 1/2007 | Nagashima et al. |
| 7,171,244 B2 | 1/2007 | Bauman |
| 7,184,728 B2 | 2/2007 | Solum |
| 7,190,748 B2 | 3/2007 | Kim et al. |
| 7,194,023 B2 | 3/2007 | Norrell et al. |
| 7,199,443 B2 | 4/2007 | Elsharawy |
| 7,200,305 B2 | 4/2007 | Dion et al. |
| 7,200,391 B2 | 4/2007 | Chung et al. |
| 7,228,072 B2 | 6/2007 | Mickelsson et al. |
| 7,263,293 B2 | 8/2007 | Ommodt et al. |
| 7,269,311 B2 | 9/2007 | Kim et al. |
| 7,280,011 B2 | 10/2007 | Bayar et al. |
| 7,286,843 B2 | 10/2007 | Scheck |
| 7,286,854 B2 | 10/2007 | Ferrato et al. |
| 7,295,119 B2 | 11/2007 | Rappaport et al. |
| 7,310,430 B1 | 12/2007 | Mallya et al. |
| 7,313,415 B2 | 12/2007 | Wake et al. |
| 7,315,735 B2 | 1/2008 | Graham |
| 7,324,730 B2 | 1/2008 | Varkey et al. |
| 7,343,164 B2 | 3/2008 | Kallstenius |
| 7,348,843 B1 | 3/2008 | Qiu et al. |
| 7,349,633 B2 | 3/2008 | Lee et al. |
| 7,359,408 B2 | 4/2008 | Kim |
| 7,359,674 B2 | 4/2008 | Markki et al. |
| 7,366,150 B2 | 4/2008 | Lee et al. |
| 7,366,151 B2 | 4/2008 | Kubler et al. |
| 7,369,526 B2 | 5/2008 | Lechleider et al. |
| 7,379,669 B2 | 5/2008 | Kim |
| 7,388,892 B2 | 6/2008 | Nishiyama et al. |
| 7,392,025 B2 | 6/2008 | Rooyen et al. |
| 7,392,029 B2 | 6/2008 | Pronkine |
| 7,394,883 B2 | 7/2008 | Funakubo et al. |
| 7,403,156 B2 | 7/2008 | Coppi et al. |
| 7,409,159 B2 | 8/2008 | Izadpanah |
| 7,412,224 B2 | 8/2008 | Kotola et al. |
| 7,424,228 B1 | 9/2008 | Williams et al. |
| 7,444,051 B2 | 10/2008 | Tatat et al. |
| 7,450,853 B2 | 11/2008 | Kim et al. |
| 7,450,854 B2 | 11/2008 | Lee et al. |
| 7,451,365 B2 | 11/2008 | Wang et al. |
| 7,454,222 B2 | 11/2008 | Huang et al. |
| 7,460,507 B2 | 12/2008 | Kubler et al. |
| 7,460,829 B2 | 12/2008 | Utsumi et al. |
| 7,460,831 B2 | 12/2008 | Hasarchi |
| 7,466,925 B2 | 12/2008 | Iannelli |
| 7,469,105 B2 | 12/2008 | Wake et al. |
| 7,477,597 B2 | 1/2009 | Segel |
| 7,483,504 B2 | 1/2009 | Shapira et al. |
| 7,483,711 B2 | 1/2009 | Burchfiel |
| 7,489,641 B2 | 2/2009 | Miller et al. |
| 7,496,070 B2 | 2/2009 | Vesuna |
| 7,496,384 B2 | 2/2009 | Seto et al. |
| 7,505,747 B2 | 3/2009 | Solum |
| 7,512,419 B2 | 3/2009 | Solum |
| 7,522,552 B2 | 4/2009 | Fein et al. |
| 7,539,509 B2 | 5/2009 | Bauman et al. |
| 7,542,452 B2 | 6/2009 | Penumetsa |
| 7,546,138 B2 | 6/2009 | Bauman |
| 7,548,138 B2 | 6/2009 | Kamgaing |
| 7,548,695 B2 | 6/2009 | Wake |
| 7,551,641 B2 | 6/2009 | Pirzada et al. |
| 7,557,758 B2 | 7/2009 | Rofougaran |
| 7,580,384 B2 | 8/2009 | Kubler et al. |
| 7,586,861 B2 | 9/2009 | Kubler et al. |
| 7,590,354 B2 | 9/2009 | Sauer et al. |
| 7,593,704 B2 | 9/2009 | Pinel et al. |
| 7,599,420 B2 | 10/2009 | Forenza et al. |
| 7,599,672 B2 | 10/2009 | Shoji et al. |
| 7,610,046 B2 | 10/2009 | Wala |
| 7,630,690 B2 | 12/2009 | Kaewell, Jr. et al. |
| 7,633,934 B2 | 12/2009 | Kubler et al. |
| 7,639,982 B2 | 12/2009 | Wala |
| 7,646,743 B2 | 1/2010 | Kubler et al. |
| 7,646,777 B2 | 1/2010 | Hicks, III et al. |
| 7,653,397 B2 | 1/2010 | Pernu et al. |
| 7,668,565 B2 | 2/2010 | Ylänen et al. |
| 7,672,643 B2 | 3/2010 | Loh |
| 7,675,936 B2 | 3/2010 | Mizutani et al. |
| 7,688,811 B2 | 3/2010 | Kubler et al. |
| 7,693,486 B2 | 4/2010 | Kasslin et al. |
| 7,697,467 B2 | 4/2010 | Kubler et al. |
| 7,697,574 B2 | 4/2010 | Suematsu et al. |
| 7,715,375 B2 | 5/2010 | Kubler et al. |
| 7,720,510 B2 | 5/2010 | Pescod et al. |
| 7,751,374 B2 | 7/2010 | Donovan |
| 7,751,838 B2 | 7/2010 | Ramesh et al. |
| 7,756,480 B2 | 7/2010 | Loh |
| 7,760,703 B2 | 7/2010 | Kubler et al. |
| 7,761,093 B2 | 7/2010 | Sabat, Jr. et al. |
| 7,768,951 B2 | 8/2010 | Kubler et al. |
| 7,773,573 B2 | 8/2010 | Chung et al. |
| 7,778,603 B2 | 8/2010 | Palin et al. |
| 7,787,823 B2 | 8/2010 | George et al. |
| 7,805,073 B2 | 9/2010 | Sabat, Jr. et al. |
| 7,809,012 B2 | 10/2010 | Ruuska et al. |
| 7,812,766 B2 | 10/2010 | Leblanc et al. |
| 7,812,775 B2 | 10/2010 | Babakhani et al. |
| 7,817,969 B2 | 10/2010 | Castaneda et al. |
| 7,835,328 B2 | 11/2010 | Stephens et al. |
| 7,848,316 B2 | 12/2010 | Kubler et al. |
| 7,848,770 B2 | 12/2010 | Scheinert |
| 7,853,234 B2 | 12/2010 | Afsahi |
| 7,870,321 B2 | 1/2011 | Rofougaran |
| 7,880,677 B2 | 2/2011 | Rofougaran et al. |
| 7,881,755 B1 | 2/2011 | Mishra et al. |
| 7,894,423 B2 | 2/2011 | Kubler et al. |
| 7,899,007 B2 | 3/2011 | Kubler et al. |
| 7,907,972 B2 | 3/2011 | Walton et al. |
| 7,912,043 B2 | 3/2011 | Kubler et al. |
| 7,912,506 B2 | 3/2011 | Lovberg et al. |
| 7,916,706 B2 | 3/2011 | Kubler et al. |

(56) References Cited

U.S. PATENT DOCUMENTS

| | | |
|---|---|---|
| 7,917,177 B2 | 3/2011 | Bauman |
| 7,920,553 B2 | 4/2011 | Kubler et al. |
| 7,920,858 B2 | 4/2011 | Sabat, Jr. et al. |
| 7,924,783 B1 | 4/2011 | Mahany et al. |
| 7,936,713 B2 | 5/2011 | Kubler et al. |
| 7,949,364 B2 | 5/2011 | Kasslin et al. |
| 7,957,777 B1 | 6/2011 | Vu et al. |
| 7,962,111 B2 | 6/2011 | Solum |
| 7,969,009 B2 | 6/2011 | Chandrasekaran |
| 7,969,911 B2 | 6/2011 | Mahany et al. |
| 7,990,925 B2 | 8/2011 | Tinnakomsrisuphap et al. |
| 7,996,020 B1 | 8/2011 | Chhabra |
| 8,018,907 B2 | 9/2011 | Kubler et al. |
| 8,023,886 B2 | 9/2011 | Rofougaran |
| 8,027,656 B2 | 9/2011 | Rofougaran et al. |
| 8,036,308 B2 | 10/2011 | Rofougaran |
| 8,082,353 B2 | 12/2011 | Huber et al. |
| 8,086,192 B2 | 12/2011 | Rofougaran et al. |
| 8,135,102 B2 | 3/2012 | Wiwel et al. |
| 8,175,535 B2 | 5/2012 | Mu |
| 8,213,401 B2 | 7/2012 | Fischer et al. |
| 8,223,795 B2 | 7/2012 | Cox et al. |
| 8,226,003 B2 | 7/2012 | Frederick et al. |
| 8,238,463 B1 | 8/2012 | Arslan et al. |
| 8,270,387 B2 | 9/2012 | Cannon et al. |
| 8,290,447 B2 | 10/2012 | Sutton et al. |
| 8,290,483 B2 | 10/2012 | Sabat, Jr. et al. |
| 8,306,563 B2 | 11/2012 | Zavadsky et al. |
| 8,346,278 B2 | 1/2013 | Wala et al. |
| 8,428,201 B1 | 4/2013 | McHann, Jr. et al. |
| 8,428,510 B2 | 4/2013 | Stratford et al. |
| 8,462,683 B2 | 6/2013 | Uyehara et al. |
| 8,472,579 B2 | 6/2013 | Uyehara et al. |
| 8,509,215 B2 | 8/2013 | Stuart |
| 8,509,850 B2 | 8/2013 | Zavadsky et al. |
| 8,526,970 B2 | 9/2013 | Wala et al. |
| 8,532,242 B2 | 9/2013 | Fischer et al. |
| 8,626,245 B2 | 1/2014 | Zavadsky et al. |
| 8,634,766 B2 | 1/2014 | Hobbs et al. |
| 8,737,454 B2 | 5/2014 | Wala et al. |
| 8,743,718 B2 | 6/2014 | Grenier et al. |
| 8,743,756 B2 | 6/2014 | Uyehara et al. |
| 8,837,659 B2 | 9/2014 | Uyehara et al. |
| 8,837,940 B2 | 9/2014 | Smith et al. |
| 8,873,585 B2 | 10/2014 | Oren et al. |
| 8,903,346 B2 | 12/2014 | Fischer et al. |
| 8,909,133 B2 | 12/2014 | Hobbs et al. |
| 8,929,288 B2 | 1/2015 | Stewart et al. |
| 8,982,995 B1 | 3/2015 | Van Cai |
| 9,042,838 B2 | 5/2015 | Braithwaite |
| 9,178,635 B2 | 11/2015 | Ben-Shlomo |
| 9,203,462 B2 | 12/2015 | Petrovic et al. |
| 9,246,721 B1 | 1/2016 | Martinez |
| 9,385,763 B1 | 7/2016 | Shi et al. |
| 9,455,760 B1 | 9/2016 | Dick et al. |
| 9,526,020 B2 | 12/2016 | Berlin et al. |
| 2001/0036163 A1 | 11/2001 | Sabat, Jr. et al. |
| 2001/0036199 A1 | 11/2001 | Terry |
| 2002/0003645 A1 | 1/2002 | Kim et al. |
| 2002/0009070 A1 | 1/2002 | Lindsay et al. |
| 2002/0012336 A1 | 1/2002 | Hughes et al. |
| 2002/0012495 A1 | 1/2002 | Sasai et al. |
| 2002/0016827 A1 | 2/2002 | McCabe et al. |
| 2002/0045519 A1 | 4/2002 | Watterson et al. |
| 2002/0048071 A1 | 4/2002 | Suzuki et al. |
| 2002/0051434 A1 | 5/2002 | Ozluturk et al. |
| 2002/0075906 A1 | 6/2002 | Cole et al. |
| 2002/0092347 A1 | 7/2002 | Niekerk et al. |
| 2002/0097564 A1 | 7/2002 | Struhsaker et al. |
| 2002/0103012 A1 | 8/2002 | Kim et al. |
| 2002/0111149 A1 | 8/2002 | Shoki |
| 2002/0111192 A1 | 8/2002 | Thomas et al. |
| 2002/0114038 A1 | 8/2002 | Arnon et al. |
| 2002/0123365 A1 | 9/2002 | Thorson et al. |
| 2002/0126967 A1 | 9/2002 | Panak et al. |
| 2002/0128009 A1 | 9/2002 | Boch et al. |
| 2002/0130778 A1 | 9/2002 | Nicholson |
| 2002/0181668 A1 | 12/2002 | Masoian et al. |
| 2002/0190845 A1 | 12/2002 | Moore |
| 2002/0197984 A1 | 12/2002 | Monin et al. |
| 2003/0002604 A1 | 1/2003 | Fifield et al. |
| 2003/0007214 A1 | 1/2003 | Aburakawa et al. |
| 2003/0016418 A1 | 1/2003 | Westbrook et al. |
| 2003/0022645 A1 | 1/2003 | Runzo |
| 2003/0045284 A1 | 3/2003 | Copley et al. |
| 2003/0069922 A1 | 4/2003 | Arunachalam |
| 2003/0078074 A1 | 4/2003 | Sesay et al. |
| 2003/0112826 A1 | 6/2003 | Ashwood Smith et al. |
| 2003/0141962 A1 | 7/2003 | Barink |
| 2003/0161637 A1 | 8/2003 | Yamamoto et al. |
| 2003/0165287 A1 | 9/2003 | Krill et al. |
| 2003/0174099 A1 | 9/2003 | Bauer et al. |
| 2003/0209601 A1 | 11/2003 | Chung |
| 2003/0216129 A1 | 11/2003 | Khalil et al. |
| 2004/0001719 A1 | 1/2004 | Sasaki |
| 2004/0008114 A1 | 1/2004 | Sawyer |
| 2004/0017785 A1 | 1/2004 | Zelst |
| 2004/0037565 A1 | 2/2004 | Young et al. |
| 2004/0041714 A1 | 3/2004 | Forster |
| 2004/0043764 A1 | 3/2004 | Bigham et al. |
| 2004/0047313 A1 | 3/2004 | Rumpf et al. |
| 2004/0078151 A1 | 4/2004 | Aljadeff et al. |
| 2004/0095907 A1 | 5/2004 | Agee et al. |
| 2004/0100930 A1 | 5/2004 | Shapira et al. |
| 2004/0106435 A1 | 6/2004 | Bauman et al. |
| 2004/0126068 A1 | 7/2004 | Van Bijsterveld |
| 2004/0126107 A1 | 7/2004 | Jay et al. |
| 2004/0139477 A1 | 7/2004 | Russell et al. |
| 2004/0146020 A1 | 7/2004 | Kubler et al. |
| 2004/0149736 A1 | 8/2004 | Clothier |
| 2004/0151164 A1 | 8/2004 | Kubler et al. |
| 2004/0151503 A1 | 8/2004 | Kashima et al. |
| 2004/0157623 A1 | 8/2004 | Splett |
| 2004/0160912 A1 | 8/2004 | Kubler et al. |
| 2004/0160913 A1 | 8/2004 | Kubler et al. |
| 2004/0162084 A1 | 8/2004 | Wang |
| 2004/0162115 A1 | 8/2004 | Smith et al. |
| 2004/0162116 A1 | 8/2004 | Han et al. |
| 2004/0165573 A1 | 8/2004 | Kubler et al. |
| 2004/0175173 A1 | 9/2004 | Deas |
| 2004/0196404 A1 | 10/2004 | Loheit et al. |
| 2004/0202257 A1 | 10/2004 | Mehta et al. |
| 2004/0203703 A1 | 10/2004 | Fischer |
| 2004/0203704 A1 | 10/2004 | Ommodt et al. |
| 2004/0203846 A1 | 10/2004 | Caronni et al. |
| 2004/0204109 A1 | 10/2004 | Hoppenstein |
| 2004/0208526 A1 | 10/2004 | Mibu |
| 2004/0208643 A1 | 10/2004 | Roberts et al. |
| 2004/0215723 A1 | 10/2004 | Chadha |
| 2004/0218873 A1 | 11/2004 | Nagashima et al. |
| 2004/0233877 A1 | 11/2004 | Lee et al. |
| 2004/0252786 A1 | 12/2004 | McHenry |
| 2004/0258105 A1 | 12/2004 | Spathas et al. |
| 2004/0267971 A1 | 12/2004 | Seshadri |
| 2005/0052287 A1 | 3/2005 | Whitesmith et al. |
| 2005/0058451 A1 | 3/2005 | Ross |
| 2005/0068179 A1 | 3/2005 | Roesner |
| 2005/0076982 A1 | 4/2005 | Metcalf et al. |
| 2005/0078006 A1 | 4/2005 | Hutchins |
| 2005/0085186 A1 | 4/2005 | Sandrin |
| 2005/0093679 A1 | 5/2005 | Zai et al. |
| 2005/0099343 A1 | 5/2005 | Asrani et al. |
| 2005/0116821 A1 | 6/2005 | Wilsey et al. |
| 2005/0123232 A1 | 6/2005 | Piede et al. |
| 2005/0141545 A1 | 6/2005 | Fein et al. |
| 2005/0143077 A1 | 6/2005 | Charbonneau |
| 2005/0147067 A1 | 7/2005 | Mani et al. |
| 2005/0147071 A1 | 7/2005 | Karaoguz et al. |
| 2005/0148306 A1 | 7/2005 | Hiddink |
| 2005/0159108 A1 | 7/2005 | Fletcher |
| 2005/0174236 A1 | 8/2005 | Brookner |
| 2005/0176458 A1 | 8/2005 | Shklarsky et al. |
| 2005/0201323 A1 | 9/2005 | Mani et al. |
| 2005/0201761 A1 | 9/2005 | Bartur et al. |

(56) References Cited

U.S. PATENT DOCUMENTS

| | | |
|---|---|---|
| 2005/0219050 A1 | 10/2005 | Martin |
| 2005/0224585 A1 | 10/2005 | Durrant et al. |
| 2005/0226625 A1 | 10/2005 | Wake et al. |
| 2005/0232636 A1 | 10/2005 | Durrant et al. |
| 2005/0242188 A1 | 11/2005 | Vesuna |
| 2005/0252971 A1 | 11/2005 | Howarth et al. |
| 2005/0266797 A1 | 12/2005 | Utsumi et al. |
| 2005/0266854 A1 | 12/2005 | Niiho et al. |
| 2005/0269930 A1 | 12/2005 | Shimizu et al. |
| 2005/0271396 A1 | 12/2005 | Iannelli |
| 2005/0272439 A1 | 12/2005 | Picciriello et al. |
| 2006/0002326 A1 | 1/2006 | Vesuna |
| 2006/0014548 A1 | 1/2006 | Bolin |
| 2006/0017633 A1 | 1/2006 | Pronkine |
| 2006/0028352 A1 | 2/2006 | McNamara et al. |
| 2006/0045054 A1 | 3/2006 | Utsumi et al. |
| 2006/0045524 A1 | 3/2006 | Lee et al. |
| 2006/0045525 A1 | 3/2006 | Lee et al. |
| 2006/0053324 A1 | 3/2006 | Giat et al. |
| 2006/0056327 A1 | 3/2006 | Coersmeier |
| 2006/0062579 A1 | 3/2006 | Kim et al. |
| 2006/0083520 A1 | 4/2006 | Healey et al. |
| 2006/0094470 A1 | 5/2006 | Wake et al. |
| 2006/0104643 A1 | 5/2006 | Lee et al. |
| 2006/0159388 A1 | 7/2006 | Kawase et al. |
| 2006/0160550 A1 | 7/2006 | Edwards |
| 2006/0172775 A1 | 8/2006 | Conyers et al. |
| 2006/0182446 A1 | 8/2006 | Kim et al. |
| 2006/0182449 A1 | 8/2006 | Iannelli et al. |
| 2006/0189354 A1 | 8/2006 | Lee et al. |
| 2006/0209745 A1 | 9/2006 | MacMullan et al. |
| 2006/0223439 A1 | 10/2006 | Pinel et al. |
| 2006/0233506 A1 | 10/2006 | Noonan et al. |
| 2006/0239630 A1 | 10/2006 | Hase et al. |
| 2006/0268738 A1 | 11/2006 | Goerke et al. |
| 2006/0274704 A1 | 12/2006 | Desai et al. |
| 2007/0009266 A1 | 1/2007 | Bothwell |
| 2007/0050451 A1 | 3/2007 | Caspi et al. |
| 2007/0054682 A1 | 3/2007 | Fanning et al. |
| 2007/0058978 A1 | 3/2007 | Lee et al. |
| 2007/0060045 A1 | 3/2007 | Prautzsch |
| 2007/0060055 A1 | 3/2007 | Desai et al. |
| 2007/0071128 A1 | 3/2007 | Meir et al. |
| 2007/0076649 A1 | 4/2007 | Lin et al. |
| 2007/0093273 A1 | 4/2007 | Cai |
| 2007/0149250 A1 | 6/2007 | Crozzoli et al. |
| 2007/0166042 A1 | 7/2007 | Seeds et al. |
| 2007/0173288 A1 | 7/2007 | Skarby et al. |
| 2007/0174889 A1 | 7/2007 | Kim et al. |
| 2007/0224954 A1 | 9/2007 | Gopi |
| 2007/0230328 A1 | 10/2007 | Saitou |
| 2007/0243899 A1 | 10/2007 | Hermel et al. |
| 2007/0248358 A1 | 10/2007 | Sauer |
| 2007/0253714 A1 | 11/2007 | Seeds et al. |
| 2007/0254592 A1 | 11/2007 | McCallister et al. |
| 2007/0257796 A1 | 11/2007 | Easton et al. |
| 2007/0264009 A1 | 11/2007 | Sabat, Jr. et al. |
| 2007/0264011 A1 | 11/2007 | Sone et al. |
| 2007/0268846 A1 | 11/2007 | Proctor et al. |
| 2007/0274279 A1 | 11/2007 | Wood et al. |
| 2007/0292143 A1 | 12/2007 | Yu et al. |
| 2007/0297005 A1 | 12/2007 | Montierth et al. |
| 2008/0002652 A1 | 1/2008 | Gupta et al. |
| 2008/0007453 A1 | 1/2008 | Vassilakis et al. |
| 2008/0013909 A1 | 1/2008 | Kostet et al. |
| 2008/0013956 A1 | 1/2008 | Ware et al. |
| 2008/0013957 A1 | 1/2008 | Akers et al. |
| 2008/0014948 A1 | 1/2008 | Scheinert |
| 2008/0026765 A1 | 1/2008 | Charbonneau |
| 2008/0031628 A1 | 2/2008 | Dragas et al. |
| 2008/0043714 A1 | 2/2008 | Pernu |
| 2008/0056167 A1 | 3/2008 | Kim et al. |
| 2008/0058018 A1 | 3/2008 | Scheinert |
| 2008/0063397 A1 | 3/2008 | Hu et al. |
| 2008/0070502 A1 | 3/2008 | George et al. |
| 2008/0080863 A1 | 4/2008 | Sauer et al. |
| 2008/0098203 A1 | 4/2008 | Master et al. |
| 2008/0118014 A1 | 5/2008 | Reunamaki et al. |
| 2008/0119198 A1 | 5/2008 | Hettstedt et al. |
| 2008/0124086 A1 | 5/2008 | Matthews |
| 2008/0124087 A1 | 5/2008 | Hartmann et al. |
| 2008/0129634 A1 | 6/2008 | Pera et al. |
| 2008/0134194 A1 | 6/2008 | Liu |
| 2008/0145061 A1 | 6/2008 | Lee et al. |
| 2008/0150514 A1 | 6/2008 | Codreanu et al. |
| 2008/0166094 A1 | 7/2008 | Bookbinder et al. |
| 2008/0194226 A1 | 8/2008 | Rivas et al. |
| 2008/0207253 A1 | 8/2008 | Jaakkola et al. |
| 2008/0212969 A1 | 9/2008 | Fasshauer et al. |
| 2008/0219670 A1 | 9/2008 | Kim et al. |
| 2008/0232305 A1 | 9/2008 | Oren et al. |
| 2008/0232799 A1 | 9/2008 | Kim |
| 2008/0247716 A1 | 10/2008 | Thomas |
| 2008/0253280 A1 | 10/2008 | Tang et al. |
| 2008/0253351 A1 | 10/2008 | Pernu et al. |
| 2008/0253773 A1 | 10/2008 | Zheng |
| 2008/0260388 A1 | 10/2008 | Kim et al. |
| 2008/0261656 A1 | 10/2008 | Bella et al. |
| 2008/0268766 A1 | 10/2008 | Narkmon et al. |
| 2008/0268833 A1 | 10/2008 | Huang et al. |
| 2008/0273844 A1 | 11/2008 | Kewitsch |
| 2008/0279137 A1 | 11/2008 | Pernu et al. |
| 2008/0280569 A1 | 11/2008 | Hazani et al. |
| 2008/0291830 A1 | 11/2008 | Pernu et al. |
| 2008/0292322 A1 | 11/2008 | Daghighian et al. |
| 2008/0298813 A1 | 12/2008 | Song et al. |
| 2008/0304831 A1 | 12/2008 | Miller, II et al. |
| 2008/0310464 A1 | 12/2008 | Schneider |
| 2008/0310848 A1 | 12/2008 | Yasuda et al. |
| 2008/0311876 A1 | 12/2008 | Leenaerts et al. |
| 2008/0311944 A1 | 12/2008 | Hansen et al. |
| 2009/0006194 A1 | 1/2009 | Sridharan et al. |
| 2009/0022304 A1 | 1/2009 | Kubler et al. |
| 2009/0028087 A1 | 1/2009 | Nguyen et al. |
| 2009/0028317 A1 | 1/2009 | Ling et al. |
| 2009/0041413 A1 | 2/2009 | Hurley |
| 2009/0047023 A1 | 2/2009 | Pescod et al. |
| 2009/0059903 A1 | 3/2009 | Kubler et al. |
| 2009/0061796 A1 | 3/2009 | Arkko et al. |
| 2009/0061939 A1 | 3/2009 | Andersson et al. |
| 2009/0061940 A1 | 3/2009 | Scheinert et al. |
| 2009/0067402 A1 | 3/2009 | Forenza et al. |
| 2009/0073916 A1 | 3/2009 | Zhang et al. |
| 2009/0081985 A1 | 3/2009 | Rofougaran et al. |
| 2009/0087179 A1 | 4/2009 | Underwood et al. |
| 2009/0088071 A1 | 4/2009 | Rofougaran |
| 2009/0088072 A1 | 4/2009 | Rofougaran et al. |
| 2009/0135078 A1 | 5/2009 | Lindmark et al. |
| 2009/0141780 A1 | 6/2009 | Cruz-Albrecht et al. |
| 2009/0149221 A1 | 6/2009 | Liu et al. |
| 2009/0154621 A1 | 6/2009 | Shapira et al. |
| 2009/0169163 A1 | 7/2009 | Abbott, III et al. |
| 2009/0175214 A1 | 7/2009 | Sfar et al. |
| 2009/0180407 A1 | 7/2009 | Sabat et al. |
| 2009/0180426 A1 | 7/2009 | Sabat et al. |
| 2009/0218407 A1 | 9/2009 | Rofougaran |
| 2009/0218657 A1 | 9/2009 | Rofougaran |
| 2009/0237317 A1 | 9/2009 | Rofougaran |
| 2009/0245084 A1 | 10/2009 | Moffatt et al. |
| 2009/0245153 A1 | 10/2009 | Li et al. |
| 2009/0245221 A1 | 10/2009 | Piipponen |
| 2009/0247109 A1 | 10/2009 | Rofougaran |
| 2009/0252136 A1 | 10/2009 | Mahany et al. |
| 2009/0252139 A1 | 10/2009 | Ludovico et al. |
| 2009/0252205 A1 | 10/2009 | Rheinfelder et al. |
| 2009/0258652 A1 | 10/2009 | Lambert et al. |
| 2009/0278596 A1 | 11/2009 | Rofougaran et al. |
| 2009/0279593 A1 | 11/2009 | Rofougaran et al. |
| 2009/0285147 A1 | 11/2009 | Subasic et al. |
| 2009/0316608 A1 | 12/2009 | Singh et al. |
| 2009/0319909 A1 | 12/2009 | Hsueh et al. |
| 2010/0002626 A1 | 1/2010 | Schmidt et al. |
| 2010/0002661 A1 | 1/2010 | Schmidt et al. |
| 2010/0002662 A1 | 1/2010 | Schmidt et al. |

(56) References Cited

U.S. PATENT DOCUMENTS

| | | |
|---|---|---|
| 2010/0014494 A1 | 1/2010 | Schmidt et al. |
| 2010/0027443 A1 | 2/2010 | LoGalbo et al. |
| 2010/0056200 A1 | 3/2010 | Tolonen |
| 2010/0080154 A1 | 4/2010 | Noh et al. |
| 2010/0080182 A1 | 4/2010 | Kubler et al. |
| 2010/0091475 A1 | 4/2010 | Toms et al. |
| 2010/0118864 A1 | 5/2010 | Kubler et al. |
| 2010/0127937 A1 | 5/2010 | Chandrasekaran et al. |
| 2010/0131214 A1 | 5/2010 | Seely et al. |
| 2010/0134257 A1 | 6/2010 | Puleston et al. |
| 2010/0142598 A1 | 6/2010 | Murray et al. |
| 2010/0142955 A1 | 6/2010 | Yu et al. |
| 2010/0144285 A1 | 6/2010 | Behzad et al. |
| 2010/0148373 A1 | 6/2010 | Chandrasekaran |
| 2010/0156721 A1 | 6/2010 | Alamouti et al. |
| 2010/0159859 A1 | 6/2010 | Rofougaran |
| 2010/0188998 A1 | 7/2010 | Pernu et al. |
| 2010/0189439 A1 | 7/2010 | Novak et al. |
| 2010/0190509 A1 | 7/2010 | Davis |
| 2010/0202326 A1 | 8/2010 | Rofougaran et al. |
| 2010/0225413 A1 | 9/2010 | Rofougaran et al. |
| 2010/0225520 A1 | 9/2010 | Mohamadi et al. |
| 2010/0225556 A1 | 9/2010 | Rofougaran et al. |
| 2010/0225557 A1 | 9/2010 | Rofougaran et al. |
| 2010/0227575 A1 | 9/2010 | Rofougaran et al. |
| 2010/0232323 A1 | 9/2010 | Kubler et al. |
| 2010/0246558 A1 | 9/2010 | Harel |
| 2010/0255774 A1 | 10/2010 | Kenington |
| 2010/0258949 A1 | 10/2010 | Henderson et al. |
| 2010/0260063 A1 | 10/2010 | Kubler et al. |
| 2010/0261501 A1 | 10/2010 | Behzad et al. |
| 2010/0266287 A1 | 10/2010 | Adhikari et al. |
| 2010/0278530 A1 | 11/2010 | Kummetz et al. |
| 2010/0284323 A1 | 11/2010 | Tang et al. |
| 2010/0290355 A1 | 11/2010 | Roy et al. |
| 2010/0309049 A1 | 12/2010 | Reunamäki et al. |
| 2010/0311472 A1 | 12/2010 | Rofougaran et al. |
| 2010/0311480 A1 | 12/2010 | Raines et al. |
| 2010/0329161 A1 | 12/2010 | Ylanen et al. |
| 2010/0329166 A1 | 12/2010 | Mahany et al. |
| 2010/0329680 A1 | 12/2010 | Presi et al. |
| 2011/0002687 A1 | 1/2011 | Sabat, Jr. et al. |
| 2011/0007724 A1 | 1/2011 | Mahany et al. |
| 2011/0007733 A1 | 1/2011 | Kubler et al. |
| 2011/0008042 A1 | 1/2011 | Stewart |
| 2011/0019999 A1 | 1/2011 | George et al. |
| 2011/0021146 A1 | 1/2011 | Pernu |
| 2011/0021224 A1 | 1/2011 | Koskinen et al. |
| 2011/0026844 A1 | 2/2011 | Francois et al. |
| 2011/0026932 A1 | 2/2011 | Yeh et al. |
| 2011/0045767 A1 | 2/2011 | Rofougaran et al. |
| 2011/0065450 A1 | 3/2011 | Kazmi |
| 2011/0066774 A1 | 3/2011 | Rofougaran |
| 2011/0069668 A1 | 3/2011 | Chion et al. |
| 2011/0071734 A1 | 3/2011 | Van Wiemeersch et al. |
| 2011/0086614 A1 | 4/2011 | Brisebois et al. |
| 2011/0116393 A1 | 5/2011 | Hong et al. |
| 2011/0116572 A1 | 5/2011 | Lee et al. |
| 2011/0122912 A1 | 5/2011 | Benjamin et al. |
| 2011/0126071 A1 | 5/2011 | Han et al. |
| 2011/0149879 A1 | 6/2011 | Noriega et al. |
| 2011/0158298 A1 | 6/2011 | Djadi et al. |
| 2011/0182230 A1 | 7/2011 | Ohm et al. |
| 2011/0194475 A1 | 8/2011 | Kim et al. |
| 2011/0200328 A1 | 8/2011 | In De Betou et al. |
| 2011/0201368 A1 | 8/2011 | Faccin et al. |
| 2011/0204504 A1 | 8/2011 | Henderson et al. |
| 2011/0206383 A1 | 8/2011 | Chien et al. |
| 2011/0211439 A1 | 9/2011 | Manpuria et al. |
| 2011/0215901 A1 | 9/2011 | Van Wiemeersch et al. |
| 2011/0222415 A1 | 9/2011 | Ramamurthi et al. |
| 2011/0222434 A1 | 9/2011 | Chen |
| 2011/0222619 A1 | 9/2011 | Ramamurthi et al. |
| 2011/0227795 A1 | 9/2011 | Lopez et al. |
| 2011/0244887 A1 | 10/2011 | Dupray et al. |
| 2011/0256878 A1 | 10/2011 | Zhu et al. |
| 2011/0268033 A1 | 11/2011 | Boldi et al. |
| 2011/0268446 A1 | 11/2011 | Cune et al. |
| 2011/0274021 A1 | 11/2011 | He et al. |
| 2011/0281536 A1 | 11/2011 | Lee et al. |
| 2012/0052892 A1 | 3/2012 | Braithwaite |
| 2012/0099490 A1 | 4/2012 | Kummetz et al. |
| 2012/0100813 A1 | 4/2012 | Mow et al. |
| 2012/0155572 A1 | 6/2012 | Kim et al. |
| 2012/0177026 A1 | 7/2012 | Uyehara et al. |
| 2013/0012195 A1 | 1/2013 | Sabat, Jr. et al. |
| 2013/0070816 A1 | 3/2013 | Aoki et al. |
| 2013/0071112 A1 | 3/2013 | Melester et al. |
| 2013/0089332 A1 | 4/2013 | Sauer et al. |
| 2013/0095870 A1 | 4/2013 | Phillips et al. |
| 2013/0210490 A1 | 8/2013 | Fischer et al. |
| 2013/0252651 A1 | 9/2013 | Zavadsky et al. |
| 2013/0260705 A1 | 10/2013 | Stratford |
| 2013/0273854 A1 | 10/2013 | Zhang et al. |
| 2013/0295980 A1 | 11/2013 | Reuven et al. |
| 2014/0016583 A1 | 1/2014 | Smith |
| 2014/0037292 A1 | 2/2014 | Stapleton et al. |
| 2014/0072064 A1 | 3/2014 | Lemson et al. |
| 2014/0112667 A1 | 4/2014 | Neukirch et al. |
| 2014/0140225 A1 | 5/2014 | Wala |
| 2014/0146797 A1 | 5/2014 | Zavadsky et al. |
| 2014/0146905 A1 | 5/2014 | Zavadsky et al. |
| 2014/0146906 A1 | 5/2014 | Zavadsky et al. |
| 2014/0219140 A1 | 8/2014 | Uyehara et al. |
| 2014/0341315 A1 | 11/2014 | Cova |
| 2015/0016441 A1 | 1/2015 | Hanson et al. |
| 2015/0033316 A1 | 1/2015 | Berlin et al. |
| 2015/0061762 A1 | 3/2015 | Charlon et al. |
| 2015/0063323 A1 | 3/2015 | Sadek et al. |
| 2015/0171878 A1 | 6/2015 | Schafferer et al. |
| 2015/0195055 A1 | 7/2015 | Ben-Shlomo |
| 2015/0229386 A1 | 8/2015 | Lange |
| 2016/0088569 A1 | 3/2016 | Frank et al. |
| 2016/0094267 A1 | 3/2016 | Petrovic et al. |
| 2016/0105816 A1 | 4/2016 | Berlin et al. |
| 2016/0134325 A1 | 5/2016 | Tageman et al. |
| 2016/0212640 A1 | 7/2016 | Kim |
| 2016/0226653 A1 | 8/2016 | Bharadia et al. |
| 2016/0249346 A1 | 8/2016 | Harel |
| 2016/0301436 A1 | 10/2016 | Zou et al. |
| 2016/0329631 A1 | 11/2016 | Rheinfelder et al. |
| 2016/0352497 A1 | 12/2016 | Daniel |
| 2017/0064565 A1 | 3/2017 | Berlin et al. |
| 2017/0135058 A1 | 5/2017 | Ghannouchi et al. |
| 2017/0208622 A1 | 7/2017 | Mizrahi et al. |
| 2017/0288716 A1 | 10/2017 | Daniel et al. |
| 2017/0318561 A1 | 11/2017 | Harel et al. |
| 2017/0331599 A1 | 11/2017 | Tang et al. |

FOREIGN PATENT DOCUMENTS

| | | |
|---|---|---|
| CA | 2065090 C | 2/1998 |
| CA | 2242707 A1 | 1/1999 |
| CN | 101389148 A | 3/2009 |
| CN | 101547447 A | 9/2009 |
| DE | 20104862 U1 | 8/2001 |
| DE | 10249414 A1 | 5/2004 |
| EP | 0477952 A2 | 4/1992 |
| EP | 0477952 A3 | 4/1992 |
| EP | 0461583 B1 | 3/1997 |
| EP | 851618 A2 | 7/1998 |
| EP | 0687400 B1 | 11/1998 |
| EP | 0993124 A2 | 4/2000 |
| EP | 1037411 A2 | 9/2000 |
| EP | 1179895 A1 | 2/2002 |
| EP | 1267447 A1 | 12/2002 |
| EP | 1347584 A2 | 9/2003 |
| EP | 1363352 A1 | 11/2003 |
| EP | 1391897 A1 | 2/2004 |
| EP | 1443687 A1 | 8/2004 |
| EP | 1455550 A2 | 9/2004 |
| EP | 1501206 A1 | 1/2005 |
| EP | 1503451 A1 | 2/2005 |
| EP | 1530316 A1 | 5/2005 |

(56) References Cited

FOREIGN PATENT DOCUMENTS

| | | | |
|---|---|---|---|
| EP | 1511203 B1 | 3/2006 |
| EP | 1267447 B1 | 8/2006 |
| EP | 1693974 A1 | 8/2006 |
| EP | 1742388 A1 | 1/2007 |
| EP | 1227605 B1 | 1/2008 |
| EP | 1954019 A1 | 8/2008 |
| EP | 1968250 A1 | 9/2008 |
| EP | 1056226 B1 | 4/2009 |
| EP | 1357683 B1 | 5/2009 |
| EP | 2081334 A1 | 7/2009 |
| EP | 2276298 A1 | 1/2011 |
| EP | 1570626 B1 | 11/2013 |
| EP | 3166231 A1 | 5/2017 |
| GB | 2323252 A | 9/1998 |
| GB | 2370170 A | 6/2002 |
| GB | 2399963 A | 9/2004 |
| GB | 2428149 A | 1/2007 |
| JP | H4189036 A | 7/1992 |
| JP | 05260018 A | 10/1993 |
| JP | 09083450 A | 3/1997 |
| JP | 09162810 A | 6/1997 |
| JP | 09200840 A | 7/1997 |
| JP | 11068675 A | 3/1999 |
| JP | 2000152300 A | 5/2000 |
| JP | 2000341744 A | 12/2000 |
| JP | 2002264617 A | 9/2002 |
| JP | 2002353813 A | 12/2002 |
| JP | 2003148653 A | 5/2003 |
| JP | 2003172827 A | 6/2003 |
| JP | 2004172734 | 6/2004 |
| JP | 2004245963 A | 9/2004 |
| JP | 2004247090 A | 9/2004 |
| JP | 2004264901 A | 9/2004 |
| JP | 2004265624 A | 9/2004 |
| JP | 2004317737 A | 11/2004 |
| JP | 2004349184 A | 12/2004 |
| JP | 2005018175 A | 1/2005 |
| JP | 2005087135 A | 4/2005 |
| JP | 2005134125 A | 5/2005 |
| JP | 2007228603 A | 9/2007 |
| JP | 2008172597 A | 7/2008 |
| KR | 20010055088 A | 7/2001 |
| WO | 9603823 A1 | 2/1996 |
| WO | 9729608 A1 | 8/1997 |
| WO | 9810600 A1 | 3/1998 |
| WO | 00042721 A1 | 7/2000 |
| WO | 0072475 A1 | 11/2000 |
| WO | 0178434 A1 | 10/2001 |
| WO | 0184760 A1 | 11/2001 |
| WO | 0221183 A1 | 3/2002 |
| WO | 0230141 A1 | 4/2002 |
| WO | 02091599 A2 | 11/2002 |
| WO | 2002019599 A1 | 11/2002 |
| WO | 02102102 A1 | 12/2002 |
| WO | 03024027 A1 | 3/2003 |
| WO | 03098175 A1 | 11/2003 |
| WO | 2004030154 A2 | 4/2004 |
| WO | 2004047472 A1 | 6/2004 |
| WO | 2004056019 A1 | 7/2004 |
| WO | 2004059934 A1 | 7/2004 |
| WO | 2004086795 A2 | 10/2004 |
| WO | 2004093471 A2 | 10/2004 |
| WO | 2005062505 A1 | 7/2005 |
| WO | 2005069203 A2 | 7/2005 |
| WO | 2005073897 A1 | 8/2005 |
| WO | 2005079386 A2 | 9/2005 |
| WO | 2005101701 A2 | 10/2005 |
| WO | 2005111959 A2 | 11/2005 |
| WO | 2006011778 A1 | 2/2006 |
| WO | 2006018592 A1 | 2/2006 |
| WO | 2006019392 A1 | 2/2006 |
| WO | 2006039941 A1 | 4/2006 |
| WO | 2006051262 A1 | 5/2006 |
| WO | 2006060754 A2 | 6/2006 |
| WO | 2006077569 A1 | 7/2006 |
| WO | 2006105185 A2 | 10/2006 |
| WO | 2006133609 A1 | 12/2006 |
| WO | 2006136811 A1 | 12/2006 |
| WO | 2007048427 A1 | 5/2007 |
| WO | 2007077451 A1 | 7/2007 |
| WO | 2007088561 A1 | 8/2007 |
| WO | 2007091026 A1 | 8/2007 |
| WO | 2008008249 A2 | 1/2008 |
| WO | 2008027213 A2 | 3/2008 |
| WO | 2008033298 A2 | 3/2008 |
| WO | 2008039830 A2 | 4/2008 |
| WO | 2008116014 A2 | 9/2008 |
| WO | 2009029077 A1 | 3/2009 |
| WO | 2006046088 A1 | 5/2009 |
| WO | 2010022156 A2 | 2/2010 |
| WO | 2010090999 A1 | 8/2010 |
| WO | 2010126667 A1 | 11/2010 |
| WO | 2010132739 A1 | 11/2010 |
| WO | 2010151849 A2 | 12/2010 |
| WO | 2011023592 A1 | 3/2011 |
| WO | 2011100095 A1 | 8/2011 |
| WO | 2011139939 A1 | 11/2011 |
| WO | 2012058061 A1 | 5/2012 |
| WO | 2012148938 A1 | 11/2012 |
| WO | 2012148940 A1 | 11/2012 |
| WO | 2013028197 A1 | 2/2013 |
| WO | 2013096563 A1 | 6/2013 |
| WO | 2013122915 A1 | 8/2013 |
| WO | 2014072947 A1 | 5/2014 |
| WO | 2015011702 A1 | 1/2015 |
| WO | 201509719 A1 | 6/2015 |
| WO | 2015089179 A1 | 6/2015 |
| WO | 2015183791 A1 | 12/2015 |
| WO | 2016124248 A1 | 8/2016 |

OTHER PUBLICATIONS

Biton et al., "Challenge: CeTV and Ca-Fi—Cellular and Wi-Fi over CATV," Proceedings of the Eleventh Annual International Conference on Mobile Computing and Networking, Aug. 28-Sep. 2, 2005, Cologne, Germany, Association for Computting Machinery, 8 pages.

Non-Final Office Action for U.S. Appl. No. 13/948,536, dated Jan. 16, 2015, 13 pages.

International Search Report for PCT/IL2014/050657, dated Dec. 1, 2014, 4 pages.

Notice of Allowance for U.S. Appl. No. 13/948,536, dated May 28, 2015, 9 pages.

Notice of Allowance for U.S. Appl. No. 13/948,536, dated Oct. 7, 2015, 7 pages.

Notice of Allowance for U.S. Appl. No. 14/146,964, dated Jul. 14, 2015, 9 pages.

Author Unknown, "DECT: The standard explained," DECT Forum, Feb. 1997, Solothurn, Switzerland, 16 pages.

Tekmar Sistemi s.r.I., "Definition of Wideband Distribution Systems," R4-020721, TSG-RAN Working Group 4 (Radio), meeting #23, Gyeongju, Korea, May 13-17, 2002, 12 pages.

International Search Report for PCT/US2013/038843 dated Jul. 18, 2013, 4 pages.

Non-final Office Action for U.S. Appl. No. 13/873,927 dated Aug. 14, 2015, 19 pages.

Final Office Action for U.S. Appl. No. 13/873,927 dated Feb. 8, 2016, 24 pages.

Advisory Action for U.S. Appl. No. 13/873,927 dated Apr. 14, 2016, 3 pages.

Non-final Office Action for U.S. Appl. No. 13/873,927 dated May 12, 2016, 23 pages.

Notice of Allowance for U.S. Appl. No. 13/873,927, dated Nov. 4, 2016, 8 pages.

Non-final Office Action for U.S. Appl. No. 14/972,149, dated Apr. 7, 2016, 9 pages.

Notice of Allowance for U.S. Appl. No. 14/972,149, dated Aug. 15, 2016, 9 pages.

Non-Final Office Action for U.S. Appl. No. 15/042,532, dated Sep. 30, 2016, 13 pages.

(56) References Cited

OTHER PUBLICATIONS

Author Unknown, "Fiber Optic Distributed Antenna System," Installation and Users Guide, ERAU Version 1.5, May 2002, Andrews Corporation, 53 pages.

Notice of Allowance for U.S. Appl. No. 13/873,927, dated Mar. 10, 2017, 8 pages.

Final Office Action for U.S. Appl. No. 15/042,532, dated Mar. 17, 2017, 16 pages.

Final Office Action for U.S. Appl. No. 15/086,861, dated May 31, 2017, 14 pages.

Advisory Action for U.S. Appl. No. 15/086,861, dated Aug. 30, 2017, 3 pages.

Non-Final Office Action for U.S. Appl. No. 15/350,503, dated Jul. 3, 2017, 9 pages.

Arredondo, Albedo et al., "Techniques for Improving In-Building Radio Coverage Using Fiber-Fed Distributed Antenna Networks," IEEE 46th Vehicular Technology Conference, Atlanta, Georgia, Apr. 28-May 1, 1996, pp. 1540-1543, vol. 3.

Bakaul, M., et al., "Efficient Multiplexing Scheme for Wavelength-Interleaved DWDM Millimeter-Wave Fiber-Radio Systems," IEEE Photonics Technology Letters, Dec. 2005, vol. 17, No. 12, pp. 2718-2720.

Cho, Bong Youl et al. "The Forward Link Performance of a PCS System with an AGC," 4th CDMA International Conference and Exhibition, "The Realization of IMT-2000," 1999, 10 pages.

Chu, Ta-Shing et al. "Fiber optic microcellular radio", IEEE Transactions on Vehicular Technology, Aug. 1991, pp. 599-606, vol. 40, Issue 3.

Cooper, A.J., "Fiber/Radio for the Provision of Cordless/Mobile Telephony Services in the Access Network," Electronics Letters, 1990, pp. 2054-2056, vol. 26.

Cutrer, David M. et al., "Dynamic Range Requirements for Optical Transmitters in Fiber-Fed Microcellular Networks," IEEE Photonics Technology Letters, May 1995, pp. 564-566, vol. 7, No. 5.

Dolmans, G. et al. "Performance study of an adaptive dual antenna handset for indoor communications", IEE Proceedings: Microwaves, Antennas and Propagation, Apr. 1999, pp. 138-144, vol. 146, Issue 2.

Ellinger, Frank et al., "A 5.2 GHz variable gain LNA MMIC for adaptive antenna combining", IEEE MTT-S International Microwave Symposium Digest, Anaheim, California, Jun. 13-19, 1999, pp. 501-504, vol. 2.

Fan, J.C. et al., "Dynamic range requirements for microcellular personal communication systems using analog fiber-optic links", IEEE Transactions on Microwave Theory and Techniques, Aug. 1997, pp. 1390-1397, vol. 45, Issue 8.

Gibson, B.C., et al., "Evanescent Field Analysis of Air-Silica Microstructure Waveguides," The 14th Annual Meeting of the IEEE Lasers and Electro-Optics Society, 7-7803-7104-4/01, Nov. 12-13, 2001, vol. 2, pp. 709-710.

Huang, C., et al., "A WLAN-Used Helical Antenna Fully Integrated with the PCMCIA Carrier," IEEE Transactions on Antennas and Propagation, Dec. 2005, vol. 53, No. 12, pp. 4164-4168.

Kojucharow, K., et al., "Millimeter-Wave Signal Properties Resulting from Electrooptical Upconversion," IEEE Transaction on Microwave Theory and Techniques, Oct. 2001, vol. 49, No. 10, pp. 1977-1985.

Monro, T.M., et al., "Holey Fibers with Random Cladding Distributions," Optics Letters, Feb. 15, 2000, vol. 25, No. 4, pp. 206-208.

Moreira, J.D., et al., "Diversity Techniques for OFDM Based WLAN Systems," The 13th IEEE International Symposium on Personal, Indoor and Mobile Radio Communications, Sep. 15-18, 2002, vol. 3, pp. 1008-1011.

Niiho, T., et al., "Multi-Channel Wireless LAN Distributed Antenna System Based on Radio-Over-Fiber Techniques," The 17th Annual Meeting of the IEEE Lasers and Electro-Optics Society, Nov. 2004, vol. 1, pp. 57-58.

Author Unknown, "ITU-T G.652, Telecommunication Standardization Sector of ITU, Series G: Transmission Systems and Media, Digital Systems and Networks, Transmission Media and Optical Systems Characteristics—Optical Fibre Cables, Characteristics of a Single-Mode Optical Fiber and Cable," ITU-T Recommendation G.652, International Telecommunication Union, Jun. 2005, 22 pages.

Author Unknown, "ITU-T G.657, Telecommunication Standardization Sector of ITU, Dec. 2006, Series G: Transmission Systems and Media, Digital Systems and Networks, Transmission Media and Optical Systems Characteristics—Optical Fibre Cables, Characteristics of a Bending Loss Insensitive Single Mode Optical Fibre and Cable for the Access Network," ITU-T Recommendation G.657, International Telecommunication Union, 20 pages.

Chowdhury et al., "Multi-service Multi-carrier Broadband MIMO Distributed Antenna Systems for In-building Optical Wireless Access," Presented at the 2010 Conference on Optical Fiber Communication and National Fiber Optic Engineers Conference, Mar. 21-25, 2010, San Diego, California, IEEE, pp. 1-3.

Opatic, D., "Radio over Fiber Technology for Wireless Access," Ericsson, Oct. 17, 2009, 6 pages.

Paulraj, A.J., et al., "An Overview of MIMO Communications—A Key to Gigabit Wireless," Proceedings of the IEEE, Feb. 2004, vol. 92, No. 2, 34 pages.

Pickrell, G.R., et al., "Novel Techniques for the Fabrication of Holey Optical Fibers," Proceedings of SPIE, Oct. 28-Nov. 2, 2001, vol. 4578, 2001, pp. 271-282.

Roh, W., et al., "MIMO Channel Capacity for the Distributed Antenna Systems," Proceedings of the 56th IEEE Vehicular Technology Conference, Sep. 2002, vol. 2, pp. 706-709.

Schweber, Bill, "Maintaining cellular connectivity indoors demands sophisticated design," EDN Network, Dec. 21, 2000, 2 pages, http://www.edn.com/design/integrated-circuit-design/4362776/Maintaining-cellular-connectivity-indoors-demands-sophisticated-design.

Seto, I., et al., "Antenna-Selective Transmit Diversity Technique for OFDM-Based WLANs with Dual-Band Printed Antennas," 2005 IEEE Wireless Communications and Networking Conference, Mar. 13-17, 2005, vol. 1, pp. 51-56.

Shen, C., et al., "Comparison of Channel Capacity for MIMO-DAS versus MIMO-CAS," The 9th Asia-Pacific Conference on Communications, Sep. 21-24, 2003, vol. 1, pp. 113-118.

Wake, D. et al., "Passive Picocell: A New Concept n Wireless Network Infrastructure," Electronics Letters, Feb. 27, 1997, vol. 33, No. 5, pp. 404-406.

Windyka, John et al., "System-Level Integrated Circuit (SLIC) Technology Development for Phased Array Antenna Applications," Contractor Report 204132, National Aeronautics and Space Administration, Jul. 1997, 94 pages.

Wnters, J., et al., "The Impact of Antenna Diversity on the Capacity of Wireless Communications Systems," IEEE Transcations on Communications, vol. 42, No. 2/3/4, Feb./Mar./Apr. 1994, pp. 1740-1751.

Yu et al., "A Novel Scheme to Generate Single-Sideband Millimeter-Wave Signals by Using Low-Frequency Local Oscillator Signal," IEEE Photonics Technology Letters, vol. 20, No. 7, Apr. 1, 2008, pp. 478-480.

Attygalle et al., "Extending Optical Transmission Distance in Fiber Wireless Links Using Passive Filtering in Conjunction with Optimized Modulation," Journal of Lightwave Technology, vol. 24, No. 4, Apr. 2006, 7 pages.

Bo Zhang et al., "Reconfigurable Multifunctional Operation Using Optical Injection-Locked Vertical-Cavity Surface-Emitting Lasers," Journal of Lightwave Technology, vol. 27, No. 15, Aug. 2009, 6 pages.

Chang-Hasnain, et al., "Ultrahigh-speed laser modulation by injection locking," Chapter 6, Optical Fiber Telecommunication V A: Components and Subsystems, Elsevier Inc., 2008, 20 pages.

Cheng Zhang et al., "60 GHz Millimeter-wave Generation by Two-mode Injection-locked Fabry-Perot Laser Using Second-Order Sideband Injection in Radio-over-Fiber System," Conference on Lasers and Electro-Optics and Quantum Electronics, Optical Society of America, May 2008, 2 pages.

Chrostowski, "Optical Injection Locking of Vertical Cavity Surface Emitting Lasers," Fall 2003, PhD dissertation University of California at Berkely, 122 pages.

(56) References Cited

OTHER PUBLICATIONS

Dang et al., "Radio-over-Fiber based architecture for seamless wireless indoor communication in the 60GHz band," Computer Communications, Elsevier B.V., Amsterdam, NL, vol. 30, Sep. 8, 2007, pp. 3598-3613.

Hyuk-Kee Sung et al., "Optical Single Sideband Modulation Using Strong Optical Injection-Locked Semiconductor Lasers," IEEE Photonics Technology Letters, vol. 19, No. 13, Jul. 1, 2007, 4 pages.

Lim et al., "Analysis of Optical Carrier-to-Sideband Ratio for Improving Transmission Performance in Fiber-Radio Links," IEEE Transactions of Microwave Theory and Techniques, vol. 54, No. 5, May 2006, 7 pages.

Lu H H et al. "Improvement of radio-on-multimode fiber systems based on light injection and optoelectronic feedback techniques," Optics Communications, vol. 266, No. 2, Elsevier B.V., Oct. 15, 2006, 4 pages.

Pleros et al., "A 60 GHz Radio-Over-Fiber Network Architecture for Seamless Communication With High Mobility," Journal of Lightwave Technology, vol. 27, No. 12, IEEE, Jun. 15, 2009, pp. 1957-1967.

Reza et al., "Degree-of-Polarization-Based PMD Monitoring for Subcarrier-Multiplexed Signals Via Equalized Carrier/Sideband Filtering," Journal of Lightwave Technology, vol. 22, No. 4, IEEE, Apr. 2004, 8 pages.

Zhao, "Optical Injection Locking on Vertical-Cavity Surface-Emitting Lasers (VCSELs): Physics and Applications," Fall 2008, PhD dissertation University of California at Berkeley, pp. 1-209.

Author Unknown, "VCSEL Chaotic Synchronization and Modulation Characteristics," Master's Thesis, Southwest Jiatong University, Professor Pan Wei, Apr. 2006, 8 pages (machine translation).

Non-Final Office Action for U.S. Appl. No. 15/086,861, dated Mar. 29, 2018, 12 pages.

Notice of Allowance for U.S. Appl. No. 15/350,503, dated Jan. 10, 2018, 8 pages.

Notice of Allowance for U.S. Appl. No. 15/086,861, dated Nov. 2, 2018, 10 pages.

Notice of Allowance for U.S. Appl. No. 15/974,007, dated Jan. 7, 2019, 7 pages.

OFFSETTING UNWANTED DOWNLINK INTERFERENCE SIGNALS IN AN UPLINK PATH IN A DISTRIBUTED ANTENNA SYSTEM (DAS)

PRIORITY APPLICATION

This application is a continuation of U.S. application Ser. No. 15/042,532 filed on Feb. 12, 2016, which claims the benefit of priority under 35 U.S.C. § 119 of U.S. Provisional Application Ser. No. 62/118,186 filed on Feb. 19, 2015, the content of both are relied upon and incorporated herein by reference in their entireties.

BACKGROUND

The disclosure relates generally to distribution of communications signals in a distributed antenna system (DAS), and more particularly to offsetting unwanted downlink interference signals in an uplink path in a DAS resulting from a shared antenna for downlink and uplink communication in a remote antenna unit (RAU).

Wireless customers are increasingly demanding digital data services, such as streaming video signals. Concurrently, some wireless customers use their wireless devices in areas that are poorly serviced by conventional cellular networks, such as inside certain buildings or areas where there is little cellular coverage. One response to the intersection of these two concerns has been the use of DASs. DASs can be particularly useful when deployed inside buildings or other indoor environments where client devices may not otherwise be able to effectively receive radio frequency (RF) signals from a source. DASs include RAUs configured to receive and transmit communications signals to client devices within the antenna range of the RAUs.

A typical DAS includes head-end equipment (HEE) communicatively coupled to a plurality of RAUs. The HEE is connected to receive a variety of wireless services for distribution to the RAUs, such as wideband code division multiple access (WCDMA), long term evolution (LTE), and wireless local area network (WLAN) communications services, as examples. To distribute such wireless communications services in a DAS, the wireless communications services can be provided in the form of analog RF communications signals and/or digital communications signals to the HEE of the DAS for distribution to the RAUs.

An RAU in the DAS may be configured to support more than one type of wireless service that operates in a variety of RF spectrums and bandwidths. Downlink wireless communications signals received by the RAU are typically amplified by a power amplifier to increase the signal strengths before distributing the downlink wireless communications signals to client devices through one or more coupled antennas. However, the amplified downlink communications signals may include a plurality of interference products. For example, these interference products may be created as a result of non-linearities of the power amplifier in the downlink path. For instance, if two downlink wireless communications signals operating on 850 MegaHertz (MHz) and 870 MHz bands, respectively, are amplified by a power amplifier, a plurality of interference products may be generated below the 850 MHz band (e.g., 830 MHz, 810 MHz, 790 MHz, and so on) and above the 870 MHz band (e.g. 890 MHz, 910 MHz, 930 MHz, and so on). Hence, the interference products should be sufficiently isolated to prevent or reduce interferences on adjacent wireless communication channels.

No admission is made that any reference cited herein constitutes prior art. Applicant expressly reserves the right to challenge the accuracy and pertinency of any cited documents.

SUMMARY

One embodiment of the disclosure relates to offsetting unwanted downlink interference signals in an uplink path in a distributed antenna system (DAS). In DASs disclosed herein, at least one remote antenna unit (RAU) is provided. The RAU is configured to receive downlink wireless communications signals in a downlink path and distribute the downlink wireless communications signals to one or more client devices through a coupled antenna. The RAU is also configured to receive "wanted" uplink wireless communications signals from the one or more client devices on an uplink path through the coupled antenna and distribute the uplink wireless communications signals on the uplink path. As used herein, "wanted" uplink wireless communications signals indicates that such uplink wireless communications signals are received from the one or more client devices to be distributed in the DAS. One or more interference products (e.g., intermodulation or harmonic product(s)) of the downlink wireless communications signals can be generated in the downlink path and leak over to the uplink path, thus interfering with the uplink wireless communications signals and degrading the uplink wireless communications signals. Thus, the one or more interference products are interferences that may degrade the "wanted" uplink wireless communications signals and thus are "unwanted" downlink interference signals. For example, a downlink power amplifier that amplifies downlink wireless communications signals before the downlink wireless communications signals are distributed to client devices may generate the one or more interference products of the downlink wireless communications signals.

In this regard, in DASs disclosed herein, an interference signal offset circuit is provided. The interference signal offset circuit can be associated with the RAU. The interference signal offset circuit is configured to offset the one or more interference products leaked from the downlink signal path to the uplink signal path. The interference signal offset circuit comprises at least one offset signal generation circuit and a signal summing circuit. The at least one offset signal generation circuit is configured to generate at least one uplink interference offset signal based on the one or more interference products leaked from the downlink path. The signal summing circuit is configured to combine the at least one uplink interference offset signal with the uplink wireless communications signals received on the uplink path, thus offsetting the one or more leaked interference products in the uplink wireless communications signals. By providing the interference signal offset circuit in the RAU to offset the one or more interference products leaked from the downlink path to the uplink path, it is possible to provide more flexibility in implementation for the RAU without degrading the uplink wireless communications signals.

An additional embodiment of the disclosure relates to an interference signal offset circuit in a DAS. The interference signal offset circuit comprises at least one offset signal generation circuit. The at least one offset signal generation circuit is configured to receive a downlink signal in a downlink path, wherein the downlink signal comprises at least one unwanted downlink interference signal. The at least one offset signal generation circuit is also configured to generate at least one uplink interference offset signal based on the received at least one unwanted downlink interference signal. The interference signal offset circuit also comprises a signal summing circuit. The signal summing circuit is configured to receive an uplink signal in an uplink path, wherein the uplink signal comprises a wanted uplink signal and the at least one unwanted downlink interference signal leaked from the downlink path to the uplink path. The signal summing circuit is also configured to receive the at least one uplink interference offset signal. The signal summing circuit is also configured to generate an output uplink signal based on the received uplink signal. The signal summing circuit is also configured to combine the received at least one uplink interference offset signal with the received uplink signal to offset the at least one unwanted downlink interference signal from the output uplink signal. The interference signal offset circuit also comprises a control circuit. The control circuit is configured to receive the output uplink signal from the signal summing circuit. The control circuit is also configured to configure the at least one offset signal generation circuit to generate the at least one uplink interference offset signal to offset the at least one unwanted downlink interference signal.

An additional embodiment of the disclosure relates to a method of offsetting at least one unwanted downlink interference signal from an uplink signal received in a DAS. The method comprises receiving a downlink signal in a downlink path, wherein the downlink signal comprises at least one unwanted downlink interference signal. The method also comprises generating at least one uplink interference offset signal based on the received at least one unwanted downlink interference signal. The method also comprises receiving an uplink signal in an uplink path, wherein the uplink signal comprises a wanted uplink signal and the at least one unwanted downlink interference signal leaked from the downlink path to the uplink path. The method also comprises generating an output uplink signal based on the uplink signal. The method also comprises combining the at least one uplink interference offset signal with the uplink signal to offset the at least one unwanted downlink interference signal in a clean output uplink signal.

An additional embodiment of the disclosure relates to an RAU in DAS. The RAU comprises a downlink power amplifier configured to amplify a plurality of downlink communications signals received in a downlink path to generate a downlink signal in the downlink path, wherein the downlink signal comprises at least one unwanted downlink interference signal. The RAU also comprises at least one antenna configured to transmit the downlink signal and receive an uplink signal. The RAU also comprises a coupling device communicatively coupled to the downlink power amplifier and the at least one antenna. The coupling device is configured to distribute the downlink signal received from the downlink path to the at least one antenna for transmission. The coupling device is also configured to distribute the uplink signal received from the at least one antenna to an uplink path, wherein the uplink signal comprises a wanted uplink signal and the at least one unwanted downlink interference signal leaked from the downlink path to the uplink path.

The RAU also comprises an interference signal offset circuit. The interference signal offset circuit comprises at least one offset signal generation circuit. The at least one offset signal generation circuit is configured to receive the downlink signal comprising the at least one unwanted downlink interference signal. The at least one offset signal generation circuit is also configured to generate at least one uplink interference offset signal based on the received at least one unwanted downlink interference signal. The interference signal offset circuit also comprises a signal summing circuit. The signal summing circuit is configured to receive the uplink signal in the uplink path. The signal summing circuit is also configured to receive the at least one uplink interference offset signal. The signal summing circuit is also configured to generate an output uplink signal based on the received uplink signal. The signal summing circuit is also configured to combine the received at least one uplink interference offset signal with the received uplink signal to offset the at least one unwanted downlink interference signal from the output uplink signal. The interference signal offset circuit also comprises a control circuit. The control circuit is configured to receive the output uplink signal from the signal summing circuit. The control circuit is also configured to configure the at least one offset signal generation circuit to generate the at least one uplink interference offset signal to offset the at least one unwanted downlink interference signal.

Additional features and advantages will be set forth in the detailed description which follows, and in part will be readily apparent to those skilled in the art from the description or recognized by practicing the embodiments as described in the written description and claims hereof, as well as the appended drawings.

It is to be understood that both the foregoing general description and the following detailed description are merely exemplary, and are intended to provide an overview or framework to understand the nature and character of the claims.

The accompanying drawings are included to provide a further understanding, and are incorporated in and constitute a part of this specification. The drawings illustrate one or more embodiment(s), and together with the description serve to explain principles and operation of the various embodiments.

DETAILED DESCRIPTION

One embodiment of the disclosure relates to offsetting unwanted downlink interference signals in an uplink path in a distributed antenna system (DAS). In DASs disclosed herein, at least one remote antenna unit (RAU) is provided. The RAU is configured to receive downlink wireless communications signals in a downlink path and distribute the downlink wireless communications signals to one or more client devices through a coupled antenna. The RAU is also configured to receive "wanted" uplink wireless communications signals from the one or more client devices on an uplink path through the coupled antenna and distribute the uplink wireless communications signals on the uplink path. As used herein, "wanted" uplink wireless communications signals indicates that such uplink wireless communications signals are received from the one or more client devices to be distributed in the DAS. One or more interference products (e.g., an intermodulation or harmonic product(s)) of the downlink wireless communications signals can be generated in the downlink path and leak over to the uplink path, thus interfering with the uplink wireless communications signals and degrading the uplink wireless communications signals. Thus, the one or more interference products are interferences that may degrade the "wanted" uplink wireless communications signals and thus are "unwanted" downlink interference signals. For example, a downlink power amplifier that amplifies downlink wireless communications signals before the downlink wireless communications signals are distributed to client devices may generate the one or more interference products of the downlink wireless communications signals.

In this regard, in DASs disclosed herein, an interference signal offset circuit is provided. The interference signal offset circuit can be associated with the RAU. The interference signal offset circuit is configured to offset the one or more interference products leaked from the downlink signal path to the uplink signal path. The interference signal offset circuit includes at least one offset signal generation circuit and a signal summing circuit. The at least one offset signal generation circuit is configured to generate at least one uplink interference offset signal based on the one or more interference products leaked from the downlink path. The signal summing circuit is configured to combine the at least one uplink interference offset signal with the uplink wireless communications signals received on the uplink path, thus offsetting the one or more leaked interference products in the uplink wireless communications signals. By providing the interference signal offset circuit in the RAU to offset the one or more interference products leaked from the downlink path to the uplink path, it is possible to provide more flexibility in implementation for the RAU without degrading the uplink wireless communications signals.

Figure 1:
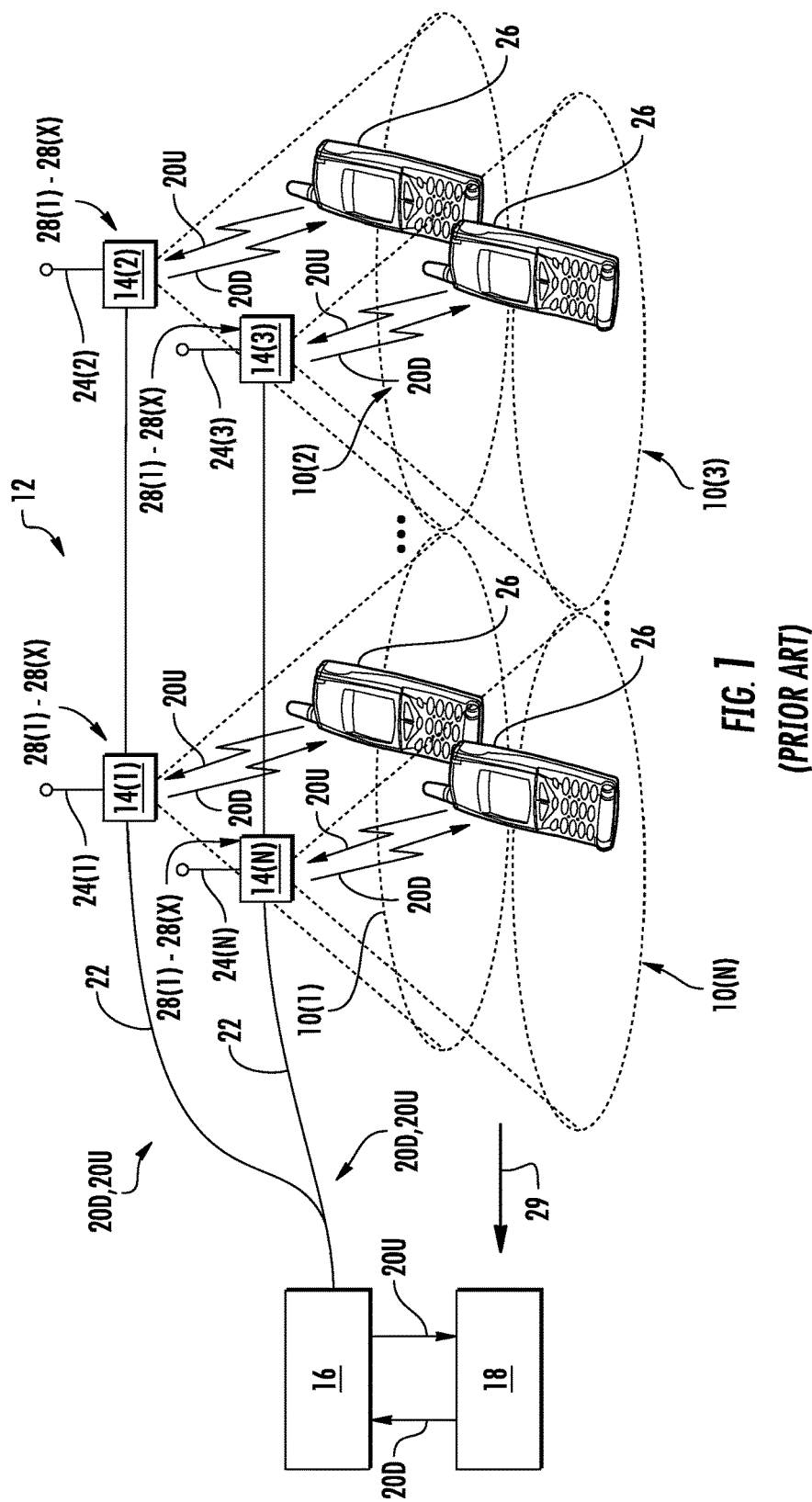
FIG. 1 is a schematic diagram of an exemplary distributed antenna system (DAS)
Figure 2:
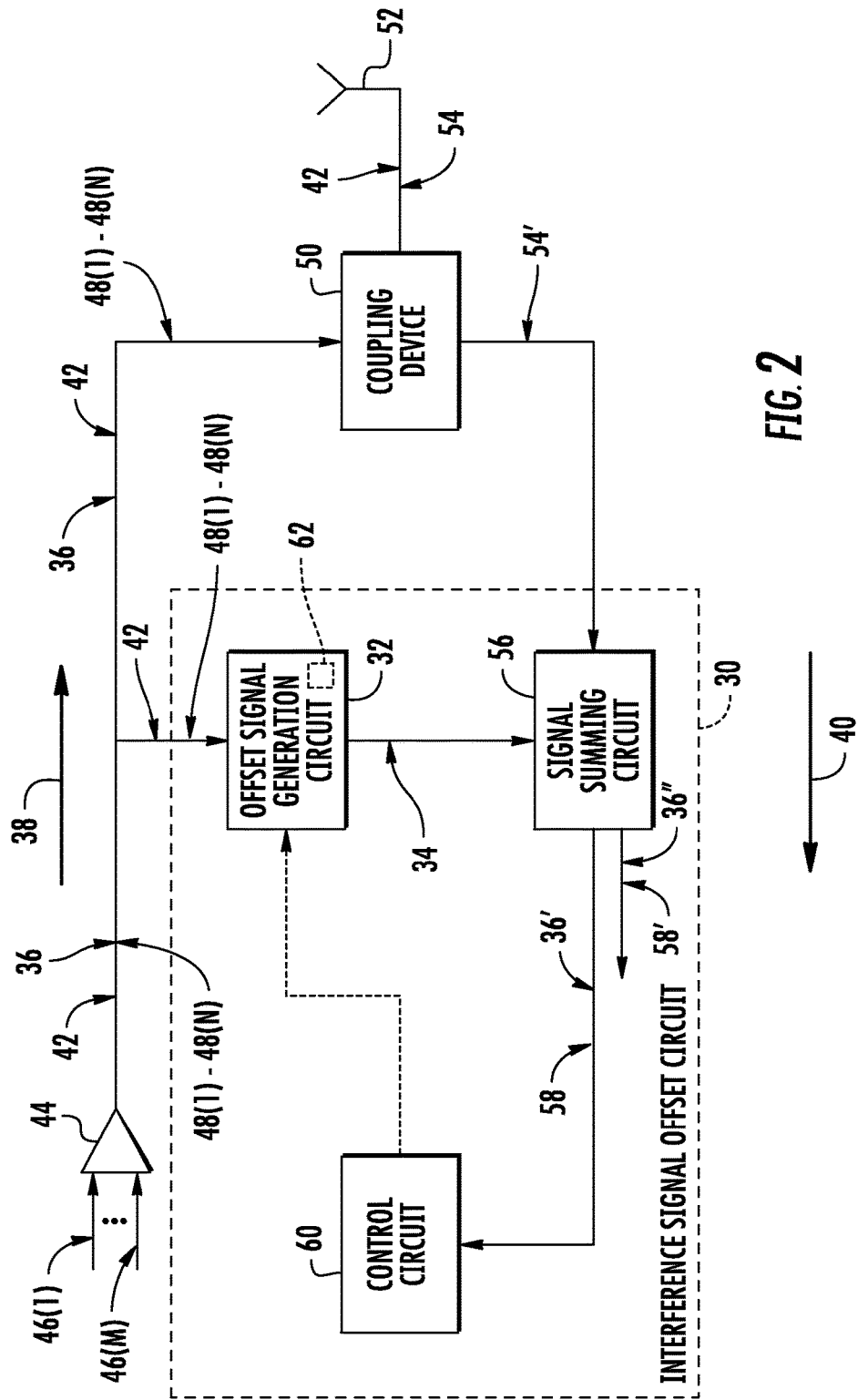
FIG. 2 is a schematic diagram of an exemplary interference signal offset circuit that can be provided in a DAS, wherein the interference signal offset circuit includes at least one offset signal generation circuit configured to generate at least one uplink interference offset signal to offset at least one unwanted downlink interference signal leaked from a downlink path to an uplink path.

Before discussing examples of offsetting unwanted downlink interference signals in an uplink path in a DAS starting at FIG. 2, a discussion of an exemplary DAS that employs a communications medium to support wireless communications services to a plurality of RAUs is first provided with reference to FIG. 1. The discussion of specific exemplary aspects of offsetting unwanted downlink interference signals in an uplink path in a DAS starts at FIG. 2.

In this regard, FIG. 1 illustrates distribution of communications services to remote coverage areas 10(1)-10(N) of a DAS 12, wherein 'N' is the number of coverage areas. These communications services can include cellular services, wireless services such as radio frequency (RF) identification (RFID) tracking, Wireless Fidelity (Wi-Fi), local area network (LAN), WLAN, and combinations thereof, as examples. The remote coverage areas 10(1)-10(N) may be remotely located. In this regard, the remote coverage areas 10(1)-10(N) are created by and centered on RAUs 14(1)-14(N) connected to a head-end equipment (HEE) 16 (e.g., a head-end controller or head-end unit or central unit). The HEE 16 may be communicatively coupled to a signal source 18, for example a base transceiver station (BTS) or a baseband unit (BBU). In this regard, the HEE 16 receives downlink communications signals 20D from the signal source 18 to be distributed to the RAUs 14(1)-14(N). The RAUs 14(1)-14(N) are configured to receive the downlink communications signals 20D from the HEE 16 over a communications medium 22 to be distributed to the respective remote coverage areas 10(1)-10(N) of the RAUs 14(1)-14(N). In a non-limiting example, the communications medium 22 may be a wired communications medium, a wireless communications medium, or an optical fiber-based communications medium. Each of the RAUs 14(1)-14(N) may include an RF transmitter/receiver (not shown) and a respective antenna 24(1)-24(N) operably connected to the RF transmitter/receiver to wirelessly distribute the communications services to client devices 26 within their respective remote coverage areas 10(1)-10(N). The RAUs 14(1)-14(N) are also configured to receive uplink communications signals 20U from the client devices 26 in their respective remote coverage areas 10(1)-10(N) to be distributed to the signal source 18. The size of a given remote coverage area 10(1)-10(N) is determined by the amount of RF power transmitted by the respective RAU 14(1)-14(N), the receiver sensitivity, antenna gain, and the RF environment, as well as by the RF transmitter/receiver sensitivity of the client device 26. Client devices 26 usually have a fixed maximum RF receiver sensitivity, so that the above-mentioned properties of the RAUs 14(1)-14(N) mainly determine the size of their respective remote coverage areas 10(1)-10(N).

With reference to FIG. 1, the downlink communications signals 20D and the uplink communications signals 20U may be distributed on adjacent downlink and uplink channels (not shown). For example, the downlink communications signals 20D may be distributed on an 850-870 MegaHertz (MHz) downlink channel and the uplink communications signals 20U may be distributed on an 825-845 MHz uplink channel. The RF transmitter/receiver in each of the RAUs 14(1)-14(N) is connected to the respective antenna 24(1)-24(N) through a coupling device (not shown). The coupling device is configured to alternate between transmitting the downlink communications signals 20D to the respective antennas 24(1)-24(N) and receiving the uplink communications signals 20U from the respective antennas 24(1)-24(N). The downlink communications signals 20D are amplified at each of the RAUs 14(1)-14(N) by a downlink power amplifier (not shown) to increase the signal strength prior to being provided to the coupling device. Due to non-linearities of the downlink power amplifier, a plurality of interference products 28(1)-28(X) may be generated and associated with the amplified downlink communications signals 20D. In this regard, the plurality of interference products 28(1)-28(X) may be leaked to an uplink path 29 due to insufficient isolation by the coupling device, thus degrading the uplink communications signals 20U. One solution for preventing these interference products 28(1)-28(X) from leaking into the uplink path 29 is to employ high isolation RF filters (e.g., cavity filters) in the coupling device. However, the high isolation RF filters may lead to significant cost increase of the RAUs 14(1)-14(N). Thus, it may be desirable to avoid using higher cost high isolation RF filters in the RAUs 14(1)-14(N) due to their significant costs.

In this regard, FIG. 2 is a schematic diagram of an exemplary interference signal offset circuit 30. The interference signal offset circuit 30 includes an offset signal generation circuit 32. The offset signal generation circuit 32 is configured to generate at least one uplink interference offset signal 34 to offset at least one unwanted downlink interference signal 36 leaked from a downlink path 38 to an uplink path 40. In this regard, the offset signal generation circuit 32 receives a downlink signal 42 in the downlink path 38. The downlink signal 42 is an amplified downlink signal 42 generated by a downlink power amplifier 44 based on one or more downlink communications signals 46(1)-46(M). Due to non-linearities of the downlink power amplifier 44, the downlink signal 42 may include the at least one unwanted downlink interference signal 36 after being amplified by the downlink power amplifier 44. The at least one unwanted downlink interference signal 36 includes one or more downlink interference products 48(1)-48(N) generated by the downlink power amplifier 44. In a non-limiting example, the one or more downlink interference products 48(1)-48(N) may be one or more downlink interference products 48(1)-48(N) resulting from spectral elements in the one or more downlink communications signals 46(1)-46(M). In another non-limiting example, the one or more downlink interference products 48(1)-48(N) may include harmonic(s) (not shown) associated with the one or more downlink communications signals 46(1)-46(M). The one or more downlink interference products 48(1)-48(N) are additional downlink signals formed at frequencies different from the downlink signal 42. In a specific but non-limiting example, the one or more downlink interference products 48(1)-48(N) may be associated with the downlink signal 42 in the form of harmonics and/or intermodulation products. A harmonic of the downlink signal 42 is a component frequency of the downlink signal 42 that is an integer multiple of a fundamental frequency of the downlink signal 42. For example, if the downlink power amplifier 44 amplifies the downlink communications signal 46(1) to generate the downlink signal 42 and the fundamental frequency of the downlink communications signal 46(1) is 850 MHz, the harmonic frequencies associated the downlink signal 42 will be 1700 MHz, 2550 MHz, 3400 MHz, and so on. The intermodulation product, on the other hand, is an amplitude modulation of signals containing two or more different frequencies, caused by nonlinearities of the downlink power amplifier 44. The intermodulation between each frequency component will form additional signals at frequencies that are not just at harmonic frequencies. For example, if the downlink power amplifier 44 received two downlink communications signals 46(1), 46(2) operating on 850 MHz and 870 MHz bands, respectively, the plurality of downlink intermodulation products 48(1)-48(N) may exist at 830 MHz, 810 MHz, 790 MHz, and so on, as well as at 890 MHz, 910 MHz, 930 MHz, and so on.

With continuing reference to FIG. 2, the downlink signal 42 and the at least one unwanted downlink interference signal 36 are also received by a coupling device 50 and distributed to one or more client devices (not shown) via at least one antenna 52 that is communicatively coupled to the coupling device 50. The coupling device 50 also receives a wanted uplink signal 54 from the one or more client devices via the antenna 52 and provides the received wanted uplink signal 54 to the uplink path 40. Accordingly, the coupling device 50 is configured to couple the downlink path 38 and the uplink path 40 to the antenna 52 for transmitting the downlink signal 42 and receiving the wanted uplink signal 54, respectively. In a non-limiting example, the coupling device 50 may be a duplexer, a multiplexer, a hybrid combiner, or a software-defined frontend module. In another non-limiting example, the coupling device 50 may be a lower-cost ceramic filter that is unable to sufficiently isolate the at least one unwanted downlink interference signal 36. As a result, the at least one unwanted downlink interference signal 36 may be leaked from the downlink path 38 to the uplink path 40. Consequently, the coupling device 50 provides an uplink signal 54', which includes the wanted uplink signal 54 and the at least one unwanted downlink interference signal 36, to the uplink path 40. In this regard, the wanted uplink signal 54 is generated by the one or more client devices for distribution on the uplink path 40. In contrast, the at least one unwanted downlink interference signal 36 is introduced by an interferer such as the downlink power amplifier 44, and thus must not be distributed on the uplink path 40.

With continuing reference to FIG. 2, the interference signal offset circuit 30 also includes a signal summing circuit 56. The signal summing circuit 56 is configured to receive the uplink signal 54' in the uplink path 40 from the coupling device 50 and generate an output uplink signal 58 based on the uplink signal 54'. In this regard, the output uplink signal 58 is similar to the uplink signal 54', since the output uplink signal 58 also includes the wanted uplink signal 54 and an interference signal 36' that is proportional to the at least one unwanted downlink interference signal 36. The signal summing circuit 56 is communicatively coupled to the offset signal generation circuit 32 to receive the at least one uplink interference offset signal 34. The at least one uplink interference offset signal 34 is configured to have a power level that substantially matches a power level of the at least one unwanted downlink interference signal 36. Furthermore, the at least one uplink interference offset signal 34 is also configured to have a phase that is substantially opposite of a phase of the at least one unwanted downlink interference signal 36. In this regard, the at least one unwanted downlink interference signal 36 may be offset by the at least one uplink interference offset signal 34 when the at least one uplink interference offset signal 34 is combined with the uplink signal 54' at the signal summing circuit 56. As such, the signal summing circuit 56 is configured to combine the at least one uplink interference offset signal 34 with the uplink signal 54' to generate a clean output uplink signal 58'. The clean output uplink signal 58' includes the wanted uplink signal 54 and an interference signal 36" that is partially (e.g., twenty decibels (20 dB) to forty decibels (40 dB)) or wholly suppressed from the at least one unwanted downlink interference signal 36. In a non-limiting example, the interference signal 36" may be suppressed from the at least one unwanted downlink interference signal 36 between 20 dB to 40 dB. In another non-limiting example, the clean output uplink signal 58' is provided to a communications signal source (not shown) such as a BTS or a BBU.

With continuing reference to FIG. 2, note that the offset signal generation circuit 32 illustrated herein may include a plurality of offset signal generation circuits 32 disposed in a parallel arrangement. Each of the plurality of offset signal generation circuits 32 may be configured to generate the at least one uplink interference offset signal 34 to offset at least one downlink interference product among the one or more downlink interference products 48(1)-48(N). In this regard, the plurality of offset signal generation circuits 32 generates a plurality of uplink interference offset signals 34, respectively. As previously discussed, the one or more downlink interference products 48(1)-48(N) may be associated with the downlink signal 42 in the form of harmonics and/or intermodulation products. In this regard, the one or more downlink interference products 48(1)-48(N) may be a plurality of downlink harmonic products and/or a plurality of downlink intermodulation products. As such, each of the plurality of offset signal generation circuits 32 may be configured to generate the at least one uplink interference offset signal 34 to offset at least one downlink harmonic product and/or at least one intermodulation product among the one or more downlink interference products 48(1)-48(N).

With continuing reference to FIG. 2, the interference signal offset circuit 30 also includes a control circuit 60 communicatively coupled to the offset signal generation circuit 32 and the signal summing circuit 56. In this regard, the control circuit 60 is configured to receive the output uplink signal 58. As is further discussed in FIGS. 4 and 5, the control circuit 60 is configured to ensure the power level of the at least one uplink interference offset signal 34 substantially matches the power level of the at least one unwanted downlink interference signal 36. The control circuit 60 may include an adjustable phase shifter 62. The control circuit 60 may control the adjustable phase shifter 62 to ensure that the phase of the at least one uplink interference offset signal 34 is substantially opposite of the phase of the at least one unwanted downlink interference signal 36. In a non-limiting example, the control circuit 60 may continuously adjust the adjustable phase shifter 62 until the at least one unwanted downlink interference signal 36 is minimized in the clean output uplink signal 58'.

Figure 3:
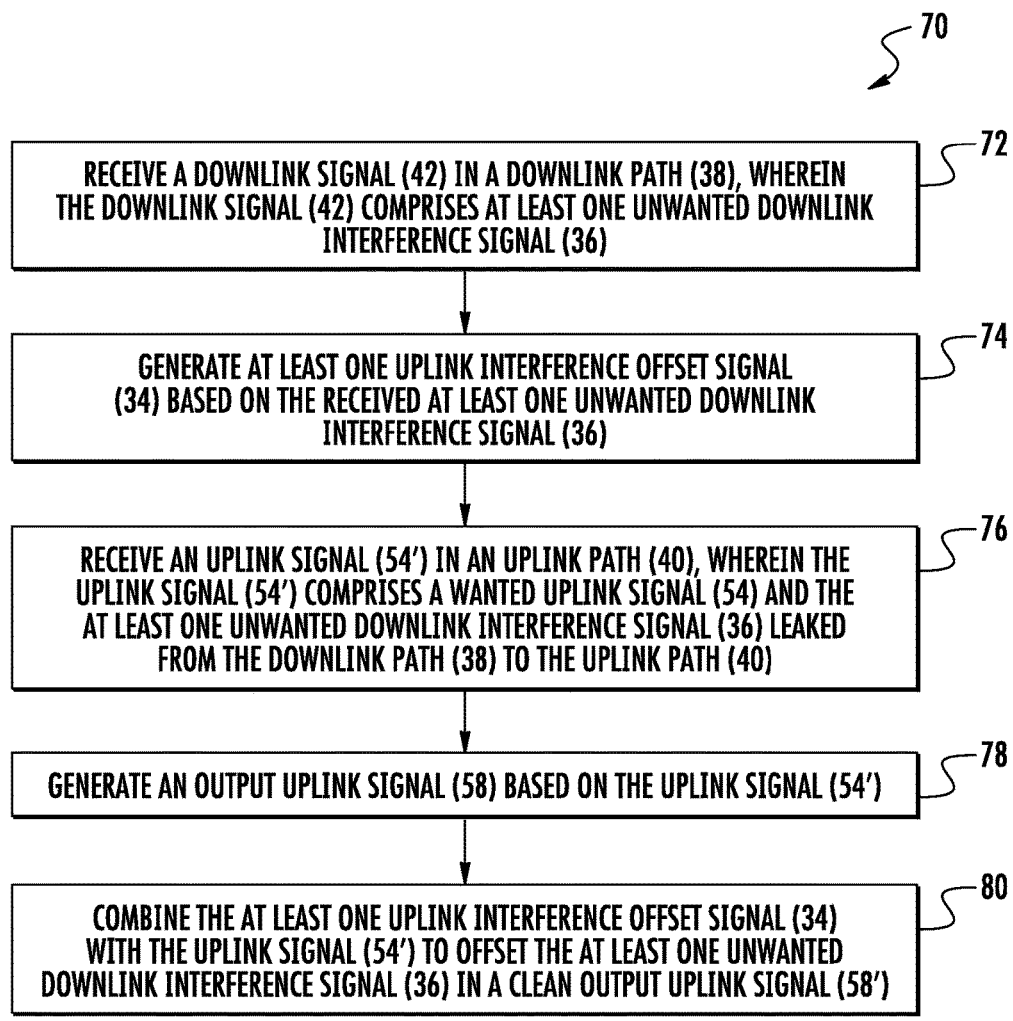
FIG. 3 is flowchart of an exemplary interference signal offset process performed by the interference signal offset circuit in FIG. 2 for offsetting the at least one unwanted downlink interference signal in an uplink path.

In this regard, FIG. 3 is flowchart of an exemplary interference signal offset process 70 for offsetting the at least one unwanted downlink interference signal 36 in FIG. 2 in the uplink path 40. With reference to FIG. 3, the downlink signal 42 is received in the downlink path 38, wherein the downlink signal 42 includes the at least one unwanted downlink interference signal 36 (block 72). Next, the at least one uplink interference offset signal 34 is generated based on the received at least one unwanted downlink interference signal 36 (block 74). The uplink signal 54' is received in the uplink path 40, wherein the uplink signal 54' includes the wanted uplink signal 54 and the at least one unwanted downlink interference signal 36 that is leaked from the downlink path 38 to the uplink path 40 (block 76). Subsequently, the output uplink signal 58 is generated based on the uplink signal 54' (block 78). In this regard, the output uplink signal 58 includes the wanted uplink signal 54 and the at least one unwanted downlink interference signal 36. Next, the at least one uplink interference offset signal 34 is combined with the uplink signal 54' to offset the at least one unwanted downlink interference signal 36 in the clean output uplink signal 58' (block 80).

Figure 4:
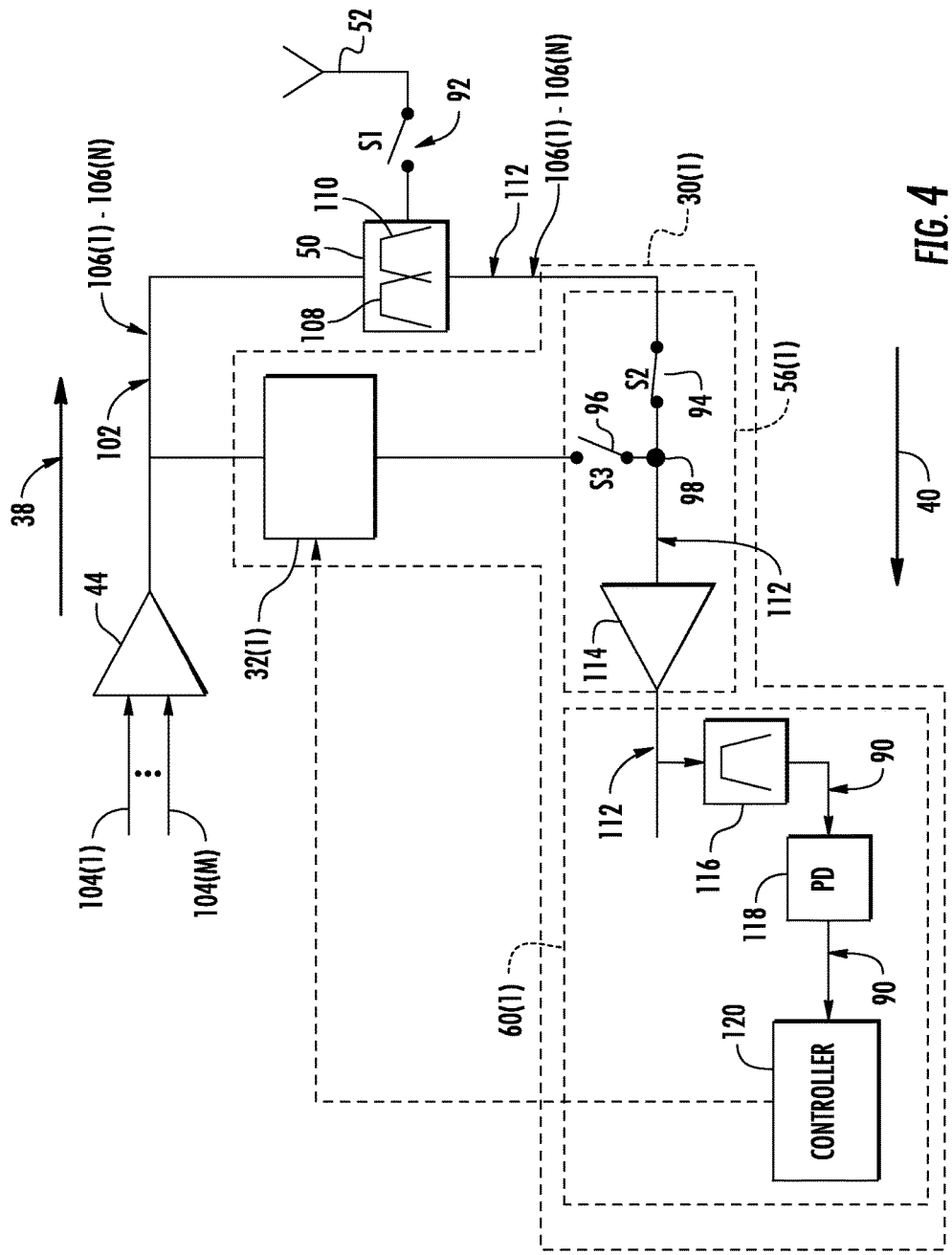
FIG. 4 is a schematic diagram of another exemplary interference signal offset circuit configured to generate at least one uplink interference offset signal to offset at least one unwanted downlink interference signal leaked from a downlink path to an uplink path based a first operation configuration to measure a power level of at least one downlink test interference product.
Figure 5:
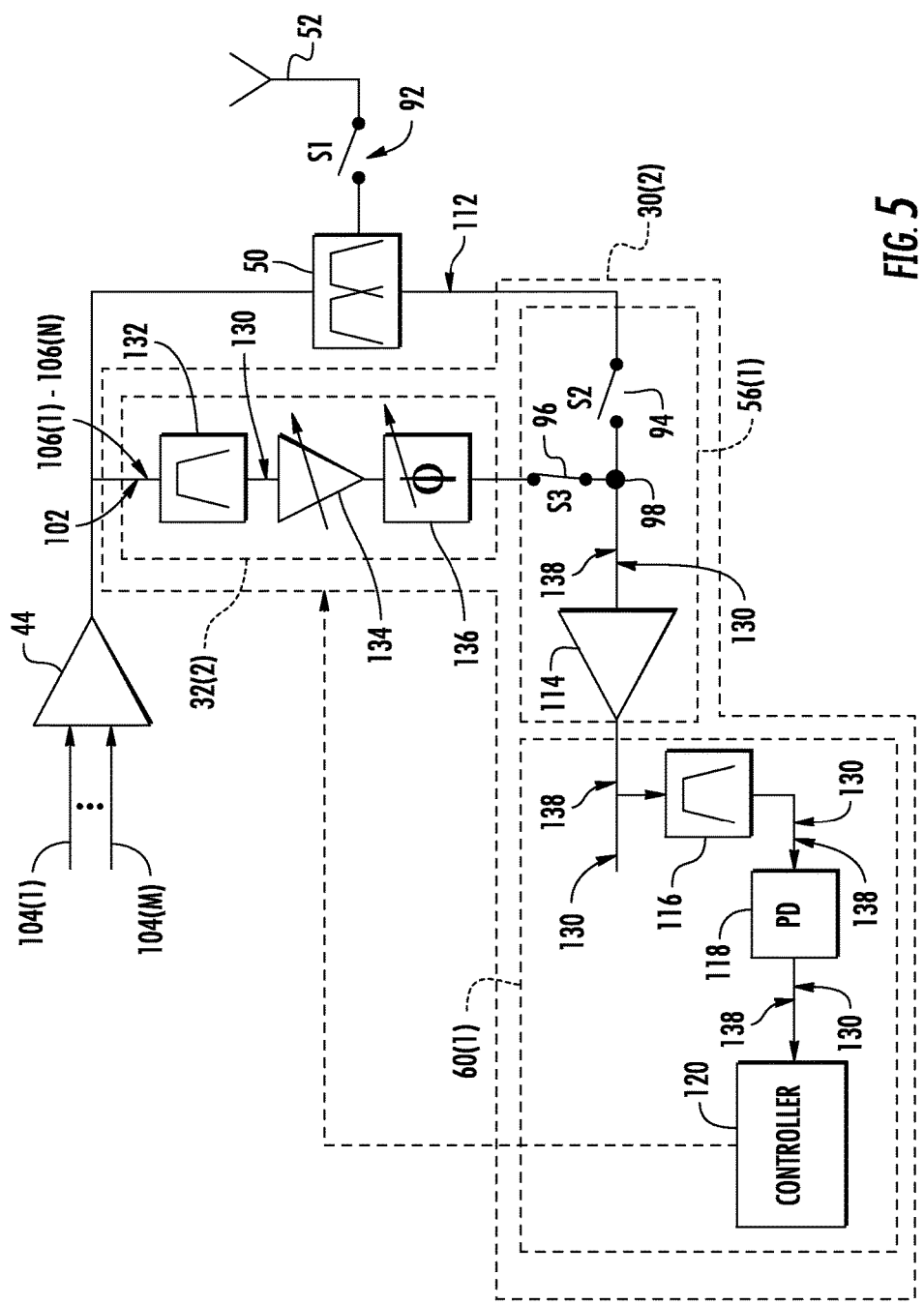
FIG. 5 is a schematic diagram of another exemplary interference signal offset circuit configured to generate at least one uplink interference offset signal to offset at least one unwanted downlink interference signal leaked from a downlink path to an uplink path, based a second operation configuration to measure a power level of at least one downlink interference product.

As previously mentioned in FIG. 2, the control circuit 60 configures the offset signal generation circuit 32 to generate the at least one uplink interference offset signal 34 to offset the at least one unwanted downlink interference signal 36. In this regard, the control circuit 60 takes two steps to configure offsetting the at least one unwanted downlink interference signal 36. In the first step, the control circuit 60 configures the interference signal offset circuit 30 based on a first operation configuration. In the second step, the control circuit 60 configures the interference signal offset circuit 30 based on a second operation configuration. In this regard, FIGS. 4 and 5 illustrate the first operation configuration and the second operation configuration, respectively. Common elements between FIGS. 2, 4, and 5 are shown with common element numbers, and thus will not be re-described herein.

In this regard, FIG. 4 is a schematic diagram of an exemplary interference signal offset circuit 30(1) configured based on the first operation configuration to measure a power level of at least one downlink test interference product 90 to help determine the power level of the at least one unwanted downlink interference signal 36 of FIG. 2. The interference signal offset circuit 30(1) includes at least one offset signal generation circuit 32(1), a signal summing circuit 56(1), and a control circuit 60(1). The coupling device 50 is coupled to the antenna 52 by a first switch (S1) 92, which is kept in an open position in the first operation configuration. The signal summing circuit 56(1) includes a second switch (S2) 94 and a third switch (S3) 96. The signal summing circuit 56(1) also includes a signal summing point 98 coupled to the second switch (S2) 94 and the third switch (S3) 96. The signal summing point 98 is configured to combine the at least one uplink interference offset signal 34 with the uplink signal 54'.

With reference to FIG. 4, the coupling device 50 receives a downlink test signal 102 in the downlink path 38. The downlink test signal 102 is an amplified downlink test signal 102 generated by the downlink power amplifier 44 based on one or more downlink test communications signals 104(1)-104(M). In a non-limiting example, the one or more downlink test communications signals 104(1)-104(M) may be generated by a signal generator (not shown) coupled to the downlink power amplifier 44. The one or more downlink test communications signals 104(1)-104(M) are in the same operating bands as the one or more downlink communications signals 46(1)-46(M) (not shown). Alternatively, the downlink test signal 102 may also be generated based on the one or more downlink communications signals 46(1)-46(M). Due to the non-linearities of the downlink power amplifier 44, the downlink test signal 102 includes one or more downlink test interference products 106(1)-106(N).

With continuing reference to FIG. 4, the coupling device 50 includes a downlink signal filter 108 and an uplink signal filter 110. Given that the first switch (S1) 92 is kept open according to the first operation configuration, the downlink test signal 102 passes through the downlink signal filter 108 and becomes an uplink test signal 112 in the uplink path 40. The downlink signal filter 108, however, is unable to provide sufficient RF isolation to eliminate the one or more downlink test interference products 106(1)-106(N) included in the downlink test signal 102. As a result, the one or more downlink test interference products 106(1)-106(N) is leaked to the uplink path 40. Given that the third switch (S3) 96 is also kept open according to the first operation configuration, the at least one offset signal generation circuit 32(1) is decoupled from the signal summing point 98. Therefore, the uplink test signal 112, along with the one or more downlink test interference products 106(1)-106(N), is received by an uplink low noise amplifier (LNA) 114 configured to amplify the uplink test signal 112.

With continuing reference to FIG. 4, the control circuit 60(1) includes an uplink signal filter 116 coupled to the LNA 114. The uplink signal filter 116 receives the uplink test signal 112 and selectively passes the at least one downlink test interference product 90 among the one or more downlink test interference products 106(1)-106(N) that is included in the uplink test signal 112. A power detection circuit 118, coupled to the uplink signal filter 116, is configured to receive and measure the power level of the at least one downlink test interference product 90 passed through the uplink signal filter 116. In a non-limiting example, a controller 120 in the control circuit 60(1) may record the measured power level of the at least one downlink test interference product 90 as the power level of the at least one unwanted downlink interference signal 36.

FIG. 5 is a schematic diagram of an exemplary interference signal offset circuit 30(2) configured based on the second operation configuration to measure a power level of at least one downlink interference product 130 to help determine the power level of the at least one uplink interference offset signal 34 of FIG. 2. Common elements between FIGS. 2, 4, and 5 are shown therein with common element numbers and will not be re-described herein. According to the second operation configuration, the first switch (S1) 92 and the second switch (S2) 94 are kept open while the third switch (S3) 96 is closed. By opening the second switch (S2) 94, the coupling device 50 is decoupled from the signal summing point 98. By closing the third switch (S3) 96, at least one offset signal generation circuit 32(2) is coupled to the signal summing point 98.

With reference to FIG. 5, the at least one offset signal generation circuit 32(2) receives the downlink test signal 102, which may include the one or more downlink test interference products 106(1)-106(N). The at least one offset signal generation circuit 32(2) includes an interference product filter 132, an adjustable gain control circuit 134, and an adjustable phase shifter 136, which may be the same as the adjustable phase shifter 62 of FIG. 2. In a non-limiting example, the interference product filter 132, the adjustable gain control circuit 134, and the adjustable phase shifter 136 may be provided as a digital interference product filter 132, a digital adjustable gain control circuit 134, and a digital adjustable phase shifter 136, respectively. The interference product filter 132 is controlled by the controller 120 to selectively pass the at least one downlink interference product 130 to the adjustable gain control circuit 134. In a non-limiting example, the at least one downlink interference product 130 passed through the interference product filter 132 is in the same order as the at least one downlink test interference product 90. For instance, if the at least one downlink test interference product 90 is a third order intermodulation product among the one or more downlink test interference products 106(1)-106(N), the at least one downlink interference product 130 is also a third order modulation product among the one or more downlink test interference products 106(1)-106(N).

With continuing reference to FIG. 5, the at least one downlink interference product 130 passes through the adjustable gain control circuit 134, the adjustable phase shifter 136, the LNA 114, and the uplink signal filter 116 without being modified. In a non-limiting example, the uplink signal filter 116 may be provided as a digital uplink signal filter 116. The power detection circuit 118 measures the power level of the at least one downlink interference product 130. Next, the controller 120 compares the power level of the at least one downlink interference product 130 against the power level of the at least one downlink test interference product 90 as measured and recorded with the first operation configuration of FIG. 4. If the power level of the at least one downlink interference product 130 is different from the power level of the at least one downlink test interference product 90, the controller 120 then controls the adjustable gain control circuit 134 to adjust the power level of the at least one downlink interference product 130 until the power level of the at least one downlink interference product 130 substantially matches the power level of the at least one downlink test interference product 90. In a non-limiting example, the controller 120 may record the power level of the at least one downlink interference product 130 as the power level of the at least one uplink interference offset signal 34.

Subsequently, the second switch (S2) 94 is closed to allow the uplink test signal 112, which includes the at least one downlink test interference product 90, to arrive at the signal summing point 98. The signal summing point 98 combines the at least one downlink test interference product 90 with the at least one downlink interference product 130 to generate an adjusted downlink interference product 138. The controller 120 may continuously control the adjustable phase shifter 136 to phase-shift of the at least one downlink interference product 130 until the at least one downlink test interference product 90 is minimized in the adjusted downlink interference product 138. In a non-limiting example, the controller 120 may control the adjustable phase shifter 136 to step through a zero to three hundred sixty degree (0°-360°) phase shift to determine an optimal phase of the at least one downlink interference product 130 that minimizes the at least one downlink test interference product 90. In another non-limiting example, the controller 120 may record the optimal phase of the at least one downlink interference product 130 as the phase of the at least one uplink interference offset signal 34. The interference signal offset circuit 30(2) is then placed in a normal operation configuration by closing the first switch (S1) 92, the second switch (S2) 94, and the third switch (S3) 96. Hence, as illustrated earlier in FIG. 2, the at least one offset signal generation circuit 32 is able to generate the at least one uplink interference offset signal 34 to offset the at least one unwanted downlink interference signal 36.

Figure 6:
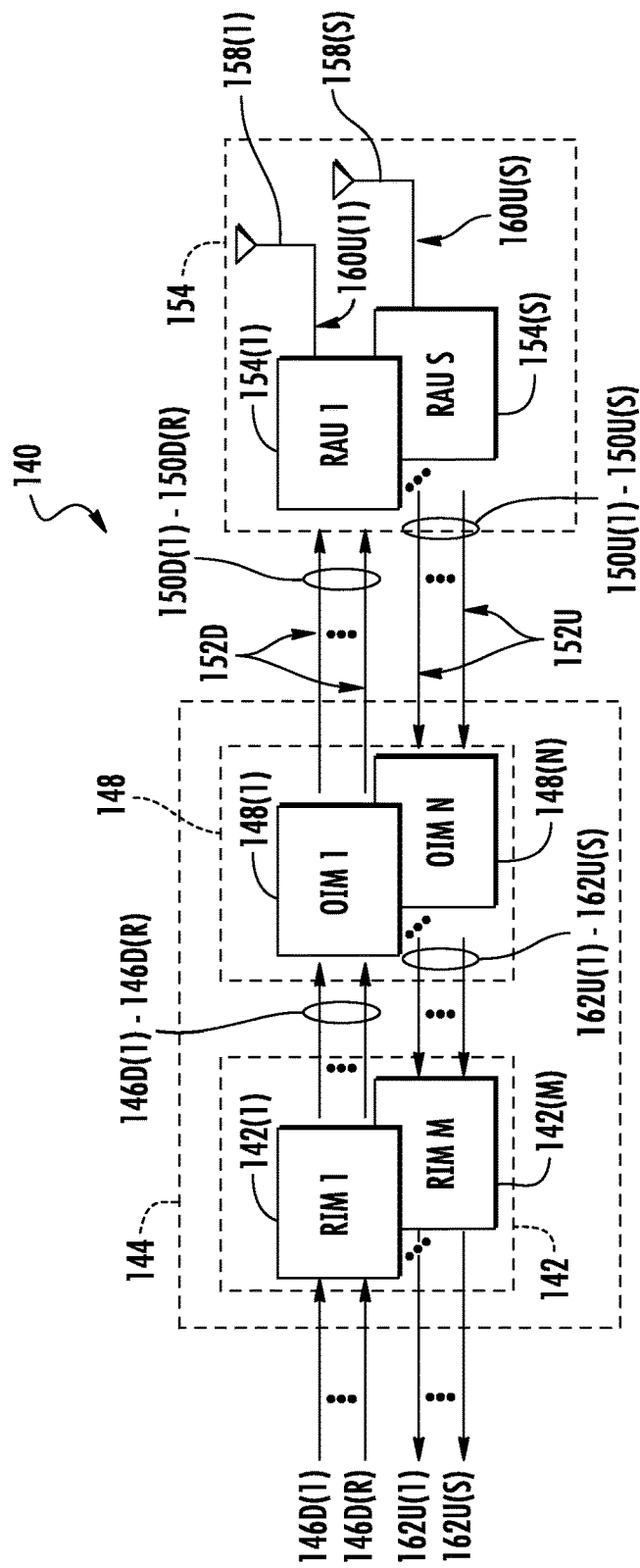
FIG. 6 is a schematic diagram of an exemplary optical fiber-based DAS that may include one or more interference signal offset circuits to generate at least one uplink interference offset signal to offset at least one unwanted downlink interference signal leaked from a downlink path to an uplink path.

The interference signal offset circuits 30, 30(1), and 30(2) in FIGS. 2, 4, and 5, respectively, can be provided in other DASs as well, without limitation. For example, FIG. 6 is a schematic diagram of exemplary optical fiber-based DAS 140 that may be employed according to the embodiments disclosed herein to include an interference signal offset circuit, like the interference signal offset circuit 30 in FIG. 2. In this embodiment, the optical fiber-based DAS 140 includes an optical fiber for distributing communications services. The optical fiber-based DAS 140 in this embodiment is included of three (3) main components. One or more radio interfaces, provided in the form of radio interface modules (RIMs) 142(1)-142(M) in this embodiment, are provided in a central unit 144 to receive and process downlink electrical communications signals 146D(1)-146D(R) prior to optical conversion into downlink optical communications signals. The RIMs 142(1)-142(M) provide both downlink and uplink interfaces. The notations "1-R" and "1-M" indicate that any number of the referenced component, 1-R and 1-M, respectively, may be provided. The central unit 144 is configured to accept the RIMs 142(1)-142(M) as modular components that can easily be installed and removed or replaced in the central unit 144. In one embodiment, the central unit 144 is configured to support up to twelve (12) RIMs 142(1)-142(12).

Each RIM 142(1)-142(M) can be designed to support a particular type of radio source or range of radio sources (i.e., frequencies) to provide flexibility in configuring the central unit 144 and the optical fiber-based DAS 140 to support the desired radio sources. For example, one RIM 142 may be configured to support the Personal Communication Services (PCS) radio band. Another RIM 142 may be configured to support a 700 MHz radio band. In this example, by inclusion of these RIMs 142, the central unit 144 could be configured to support and distribute communications signals on both PCS and Long Term Evolution (LTE) radio bands, as an example. The RIMs 142(1)-142(M) may be provided in the central unit 144 that support any frequency bands desired, including but not limited to the US Cellular band, Personal Communication Services (PCS) band, Advanced Wireless Services (AWS) band, 700 MHz band, LTE bands, Global System for Mobile communications (GSM) 900, GSM 1800, and Universal Mobile Telecommunications System (UMTS). The RIMs 142(1)-142(M) may also be provided in the central unit 144 that support any wireless technologies desired, including but not limited to Code Division Multiple Access (CDMA), CDMA200, 1×RTT, Evolution-Data Only (EV-DO), UMTS, High-speed Packet Access (HSPA), GSM, General Packet Radio Services (GPRS), Enhanced Data GSM Environment (EDGE), Time Division Multiple Access (TDMA), LTE, Integrated Digital Enhanced Network (iDEN), and Cellular Digital Packet Data (CDPD).

The RIMs 142(1)-142(M) may be provided in the central unit 144 that support any frequencies desired, including but not limited to US Federal Communications Commission (FCC) and Industry Canada frequencies (824-849 MHz on uplink and 869-894 MHz on downlink), US FCC and Industry Canada frequencies (1850-1915 MHz on uplink and 1930-1995 MHz on downlink), US FCC and Industry Canada frequencies (1710-1755 MHz on uplink and 2110-2155 MHz on downlink), US FCC frequencies (698-716 MHz and 776-787 MHz on uplink and 728-746 MHz on downlink), EU R & TTE frequencies (880-915 MHz on uplink and 925-960 MHz on downlink), EU R & TTE frequencies (1710-1785 MHz on uplink and 1805-1880 MHz on downlink), EU R & TTE frequencies (1920-1980 MHz on uplink and 2110-2170 MHz on downlink), US FCC frequencies (806-824 MHz on uplink and 851-869 MHz on downlink), US FCC frequencies (896-901 MHz on uplink and 929-941 MHz on downlink), US FCC frequencies (793-805 MHz on uplink and 763-775 MHz on downlink), and US FCC frequencies (2495-2690 MHz on uplink and downlink).

The downlink electrical communications signals 146D(1)-146D(R) are provided to a plurality of optical interfaces, provided in the form of optical interface modules (OIMs) 148(1)-148(N) in this embodiment, to convert the downlink electrical communications signals 146D(1)-146D(R) into downlink optical communications signals 150D(1)-150D(R). The notation "1-N" indicates that any number of the referenced component 1-N may be provided. The OIMs 148(1)-148(N) may be configured to provide one or more optical interface components (OICs) (not shown) that contain optical-to-electrical (O/E) and electrical-to-optical (E/O) converters (not shown), as will be described in more detail below. The OIMs 148(1)-148(N) support the radio bands that can be provided by the RIMs 142(1)-142(M), including the examples previously described above. Thus, in this embodiment, the OIMs 148(1)-148(N) may support a radio band range from 400 MHz to 2700 MHz, as an example.

The OIMs 148(1)-148(N) each include E/O converters to convert the downlink electrical communications signals 146D(1)-146D(R) into the downlink optical communications signals 150D(1)-150D(R). The downlink optical communications signals 150D(1)-150D(R) are communicated over a downlink optical fiber communications medium 152D to a plurality of remote antenna units (RAUs) 154(1)-154(S). The notation "1-S" indicates that any number of the referenced component 1-S may be provided. O/E converters provided in the RAUs 154(1)-154(S) convert the downlink optical communications signals 150D(1)-150D(R) back into the downlink electrical communications signals 146D(1)-146D(R), which are provided to antennas 158(1)-158(S) in the RAUs 154(1)-154(S) to client devices (not shown) in the reception range of the antennas 158(1)-158(S).

E/O converters are also provided in the RAUs 154(1)-154(S) to convert uplink electrical communications signals 160U(1)-160U(S) received from client devices through the antennas 158(1)-158(S) into uplink optical communications signals 150U(1)-150U(S) to be communicated over an uplink optical fiber communications medium 152U to the OIMs 148(1)-148(N). The OIMs 148(1)-148(N) include O/E converters that convert the uplink optical communications signals 150U(1)-150U(S) into uplink electrical communications signals 162U(1)-162U(S) that are processed by the RIMs 142(1)-142(M) and provided as the uplink electrical communications signals 162U(1)-162U(S). Note that the downlink optical fiber communications medium 152D and the uplink optical fiber communications medium 152U connected to each RAU 154(1)-154(S) may be a common optical fiber communications medium, wherein for example, wave division multiplexing (WDM) may be employed to provide the downlink optical communications signals 150D(1)-150D(R) and the uplink optical communications signals 150U(1)-150U(S) on the same optical fiber communications medium.

Figure 7:
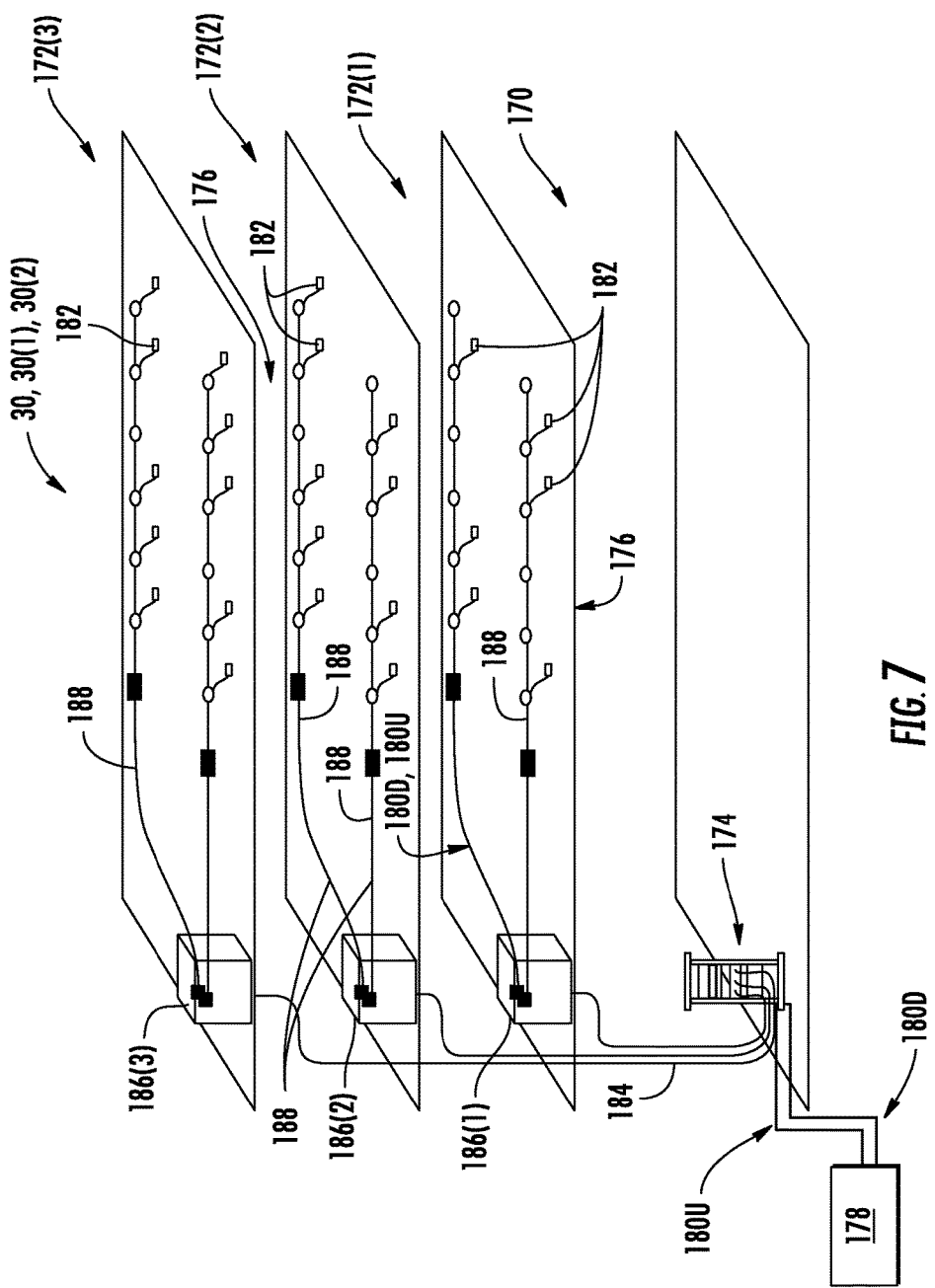
FIG. 7 is a partially schematic cut-away diagram of an exemplary building infrastructure in which an interference signal offset circuit, including the interference signal offset circuits of FIGS. 2, 4, and 5, can be employed.

The interference signal offset circuits 30, 30(1), and 30(2) of FIGS. 2, 4, and 5, respectively, may be provided in an indoor environment, as illustrated in FIG. 7. FIG. 7 is a partially schematic cut-away diagram of an exemplary building infrastructure 170 in which an interference signal offset circuit, including the interference signal offset circuits 30, 30(1), and 30(2) of FIGS. 2, 4, and 5, respectively, can be employed. The building infrastructure 170 in this embodiment includes a first (ground) floor 172(1), a second floor 172(2), and a third floor 172(3). The floors 172(1)-172(3) are serviced by a central unit 174 to provide antenna coverage areas 176 in the building infrastructure 170. The central unit 174 is communicatively coupled to a base station 178 to receive downlink communications signals 180D from the base station 178. The central unit 174 is communicatively coupled to RAUs 182 to receive uplink communications signals 180U from the RAUs 182, as previously discussed above. The downlink and uplink communications signals 180D, 180U communicated between the central unit 174 and the RAUs 182 are carried over a riser cable 184. The riser cable 184 may be routed through interconnect units (ICUs) 186(1)-186(3) dedicated to each of the floors 172(1)-172(3) that route the downlink and uplink communications signals 180D, 180U to the RAUs 182 and also provide power to the RAUs 182 via array cables 188.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred.

It will be apparent to those skilled in the art that various modifications and variations can be made without departing from the spirit or scope of the invention. Since modifications combinations, sub-combinations and variations of the disclosed embodiments incorporating the spirit and substance of the invention may occur to persons skilled in the art, the invention should be construed to include everything within the scope of the appended claims and their equivalents.

What is claimed is:

1. An interference signal offset circuit comprising:
   at least one offset signal generation circuit configured to:
      receive a downlink signal in a downlink path, the downlink signal comprising at least one unwanted downlink interference signal; and
      generate at least one uplink interference offset signal based on the received at least one unwanted downlink interference signal;
   a signal summing circuit configured to:
      receive an uplink signal in an uplink path, the uplink signal comprising a wanted uplink signal and the at least one unwanted downlink interference signal leaked from the downlink path to the uplink path;
      receive the at least one uplink interference offset signal;
      generate an output uplink signal based on the received uplink signal; and
      combine the received at least one uplink interference offset signal with the received uplink signal to offset the at least one unwanted downlink interference signal from the output uplink signal; and
   a control circuit configured to:
      measure a power level of the at least one unwanted downlink interference signal;
      receive the output uplink signal from the signal summing circuit; and
      configure the at least one offset signal generation circuit to generate the at least one uplink interference offset signal based on the measured power level of the at least one unwanted downlink interference signal to offset the at least one unwanted downlink interference signal.

2. The interference signal offset circuit of claim 1, wherein:
   the at least one unwanted downlink interference signal comprises one or more downlink interference products; and
   the at least one offset signal generation circuit is configured to generate the at least one uplink interference offset signal based on at least one downlink interference product among the one or more downlink interference products in the received at least one unwanted downlink interference signal.

3. The interference signal offset circuit of claim 2, wherein the control circuit is further configured to:
   measure a power level of the at least one downlink interference product among the one or more downlink interference products; and
   configure the at least one offset signal generation circuit to generate the at least one uplink interference offset signal based on the measured power level of the at least one downlink interference product.

4. The interference signal offset circuit of claim 3, wherein the at least one offset signal generation circuit is configured generate the at least one uplink interference offset signal to substantially match the power level of the at least one downlink interference product and be substantially opposite in phase of a phase of the at least one downlink interference product.

5. The interference signal offset circuit of claim 2, wherein the at least one uplink interference offset signal generated by the at least one offset signal generation circuit is configured to offset the at least one downlink interference product among the one or more downlink interference products in the received at least one unwanted downlink interference signal.

6. The interference signal offset circuit of claim 1, wherein:
   the at least one unwanted downlink interference signal comprises a plurality of downlink intermodulation products; and
   the at least one offset signal generation circuit is configured to generate the at least one uplink interference offset signal based on at least one downlink intermodulation product among the plurality of downlink intermodulation products in the received at least one unwanted downlink interference signal.

7. The interference signal offset circuit of claim 1, wherein:
   the at least one unwanted downlink interference signal comprises a plurality of downlink harmonic products; and
   the at least one offset signal generation circuit is configured to generate the at least one uplink interference offset signal based on at least one downlink harmonic product among the plurality of downlink harmonic products in the received at least one unwanted downlink interference signal.

8. A method of offsetting at least one unwanted downlink interference signal from an uplink signal comprising:
   receiving a downlink signal in a downlink path, wherein the downlink signal comprises at least one unwanted downlink interference signal;
   measuring a power level of the at least one unwanted downlink interference signal;
   generating at least one uplink interference offset signal based on the measured power level of the at least one unwanted downlink interference signal;
   receiving an uplink signal in an uplink path, wherein the uplink signal comprises a wanted uplink signal and the at least one unwanted downlink interference signal leaked from the downlink path to the uplink path;
   generating an output uplink signal based on the received uplink signal; and
   combining the at least one uplink interference offset signal with the received uplink signal to offset the at least one unwanted downlink interference signal in a clean output uplink signal.

9. The method of claim 8, further comprising generating the at least one uplink interference offset signal to offset at least one downlink interference product among one or more downlink interference products in the received at least one unwanted downlink interference signal.

10. The method of claim 8, further comprising:
    generating the at least one uplink interference offset signal by at least one offset signal generation circuit; and
    combining the uplink signal with the at least one uplink interference offset signal by a signal summing circuit.

11. The method of claim 10, further comprising receiving the uplink signal from a coupling device communicatively coupled to at least one antenna, wherein the coupling device is further configured to provide the downlink signal to the at least one antenna.

12. The method of claim 8, further comprising adjusting a power level of the at least one uplink interference offset signal to substantially match the power level of the at least one unwanted downlink interference signal.

13. The method of claim 8, further comprising generating the at least one uplink interference offset signal to offset at least one downlink intermodulation product among a plurality of downlink intermodulation products in the received at least one unwanted downlink interference signal.

14. The method of claim 8, further comprising generating the at least one uplink interference offset signal to offset at least one downlink harmonic product among a plurality of downlink harmonic products in the received at least one unwanted downlink interference signal.

15. A remote unit (RU), comprising:
a downlink power amplifier configured to amplify a plurality of downlink communications signals received in a downlink path to generate a downlink signal in the downlink path, the downlink signal comprising at least one unwanted downlink interference signal;
at least one antenna configured to transmit the downlink signal and receive an uplink signal;
a coupling device communicatively coupled to the downlink power amplifier and the at least one antenna, wherein the coupling device is configured to:
 distribute the downlink signal received from the downlink path to the at least one antenna for transmission; and
 distribute the uplink signal received from the at least one antenna to an uplink path, the uplink signal comprising a wanted uplink signal and the at least one unwanted downlink interference signal leaked from the downlink path to the uplink path; and
an interference signal offset circuit, comprising:
 at least one offset signal generation circuit configured to:
  receive the downlink signal comprising the at least one unwanted downlink interference signal; and
  generate at least one uplink interference offset signal based on the received at least one unwanted downlink interference signal;
 a signal summing circuit configured to:
  receive the uplink signal in the uplink path;
  receive the at least one uplink interference offset signal;
  generate an output uplink signal based on the received uplink signal; and
  combine the received at least one uplink interference offset signal with the received uplink signal to offset the at least one unwanted downlink interference signal from the output uplink signal; and
 a control circuit configured to:
  measure a power level of the at least one unwanted downlink interference signal;
  receive the output uplink signal from the signal summing circuit; and
  configure the at least one offset signal generation circuit to generate the at least one uplink interference offset signal based on the measured power level of the at least one unwanted downlink interference signal to offset the at least one unwanted downlink interference signal.

16. The RU of claim 15, wherein the coupling device is selected from the group consisting of: a duplexes; a multiplexer; a hybrid combiner; and a software-defined frontend module.

17. The RU of claim 15, wherein the at least one unwanted downlink interference signal comprises one or more downlink interference products generated when the plurality of downlink communications signals is amplified by the downlink power amplifier to generate the downlink signal.

18. The RU of claim 17, wherein the at least one unwanted downlink interference signal leaked from the downlink path to the uplink path by the coupling device comprises the one or more downlink interference products.

19. The RU of claim 17, wherein the at least one offset signal generation circuit is configured to generate the at least one uplink interference offset signal to offset at least one downlink interference product comprised in the at least one unwanted downlink interference signal.

20. The RU of claim 17, wherein:
the at least one offset signal generation circuit comprises a plurality of offset signal generation circuits disposed in a parallel arrangement, each of the plurality of offset signal generation circuits configured to receive the downlink signal; and
the at least one uplink interference offset signal comprises a plurality of uplink interference offset signals, each of the plurality of uplink interference offset signals configured to offset at least one downlink interference product among the one or more downlink interference products.

21. The RU of claim 17, wherein the at least one offset signal generation circuit comprises:
an interference product filter configured to selectively pass at least one downlink interference product among the one or more downlink interference products;
an adjustable gain control circuit coupled to the interference product filter and configured to amplify the at least one downlink interference product passing through the interference product filter; and
an adjustable phase shifter coupled to the adjustable gain control circuit and configured to phase-shift the at least one downlink interference product;
wherein the at least one offset signal generation circuit is further configured to provide the amplified and phase-shifted at least one downlink interference product to the signal summing circuit as the at least one uplink interference offset signal.

* * * * *

UNITED STATES PATENT AND TRADEMARK OFFICE
CERTIFICATE OF CORRECTION

PATENT NO. : 10,292,114 B2
APPLICATION NO. : 15/794605
DATED : May 14, 2019
INVENTOR(S) : Dror Harel Page 1 of 2

It is certified that error appears in the above-identified patent and that said Letters Patent is hereby corrected as shown below:

On the Title Page

On page 2, in Column 1, item (56), U.S. Patent Documents, Line 5, delete "Guibardo" and insert -- Giubardo --, therefor.

On page 5, in Column 1, item (56), U.S. Patent Documents, Line 11, delete "Tinnakomsrisuphap" and insert -- Tinnakornsrisuphap --, therefor.

On page 8, in Column 2, item (56), other publications, Line 4, delete "Computting" and insert -- Computing --, therefor.

On page 8, in Column 2, item (56), other publications, Line 16, delete "Solothum," and insert -- Solothurn, --, therefor.

On page 9, in Column 2, item (56), other publications, Line 39, delete "n" and insert -- in --, therefor.

On page 9, in Column 2, item (56), other publications, Line 46, delete "Wnters" and insert -- Winters --, therefor.

On page 9, in Column 2, item (56), other publications, Line 47, delete "Transcations" and insert -- Transactions --, therefor.

On page 9, in Column 2, item (56), other publications, Line 72, delete "Berkely" and insert -- Berkeley --, therefor.

On page 10, in Column 2, item (56), other publications, Line 11, delete "Jiatong" and insert -- Jiaotong --, therefor.

Signed and Sealed this
Seventeenth Day of March, 2020

Andrei Iancu
*Director of the United States Patent and Trademark Office*

CERTIFICATE OF CORRECTION (continued)
U.S. Pat. No. 10,292,114 B2

In the Claims

In Column 16, Line 2, Claim 4, delete "phase of a phase of the" and insert -- phase of the --, therefor.

In Column 18, Line 8, Claim 16, delete "duplexes;" and insert -- duplexer; --, therefor.